United States Patent [19]

Okumura et al.

[11] Patent Number: 4,951,218

[45] Date of Patent: Aug. 21, 1990

[54] POSITIONAL INFORMATION DETECTING METHOD IN ARC WELDING

[75] Inventors: Shinji Okumura; Hiroaki Ito; Seigo Nishikawa; Tatsumi Nakazato, all of Fukuoka, Japan

[73] Assignee: Kabushiki Kaisha Yaskawa Denki Seisakusho, Kitakyushu, Japan

[21] Appl. No.: 187,664

[22] PCT Filed: Jul. 15, 1987

[86] PCT No.: PCT/JP87/00517

§ 371 Date: Mar. 7, 1988

§ 102(e) Date: Mar. 7, 1988

[87] PCT Pub. No.: WO88/00508

PCT Pub. Date: Jan. 28, 1988

[30] Foreign Application Priority Data

Jul. 15, 1986 [JP] Japan .................. 61-167069
Jul. 15, 1986 [JP] Japan .................. 61-167070
Jul. 15, 1986 [JP] Japan .................. 61-167071
Sep. 6, 1986 [JP] Japan .................. 61-210480
Sep. 11, 1986 [JP] Japan .................. 61-215471
Feb. 20, 1987 [JP] Japan .................. 62-038786

[51] Int. Cl.$^5$ .................. G06F 15/46; B23K 9/12
[52] U.S. Cl. .................. 364/477; 219/124.34; 364/513; 901/42; 901/47

[58] Field of Search .................. 364/513, 477; 901/42, 901/47; 219/124.34, 121.79

[56] References Cited

U.S. PATENT DOCUMENTS 4,280,137 7/1981 Ashida et al. .................. 219/124.34
4,567,348 1/1986 Smith et al. .................. 901/47
4,667,082 5/1987 Shibata et al. .................. 901/42

FOREIGN PATENT DOCUMENTS 57-168780 10/1982 Japan .

Primary Examiner—Joseph Ruggiero
Attorney, Agent, or Firm—Jordan and Hamburg

[57] ABSTRACT

Herein disclosed is a method of detecting information on an arc welding position by monitoring the shape and/or position of an welding arc. When in the arc welding along a welding groove position while locating the same, the shape of the arc is picked up from above the joint portion of a member to be welded by means of an image pickup device, and the arc shape picked up is binary-coded. This binary arc shape and/or position are monitored to detect the welding groove position, the height of the welding torch, the welding start point, the welding end point, the external corner point, the internal corner point, the contact point of the welding wire with the work, and the welding groove gap.

2 Claims, 24 Drawing Sheets

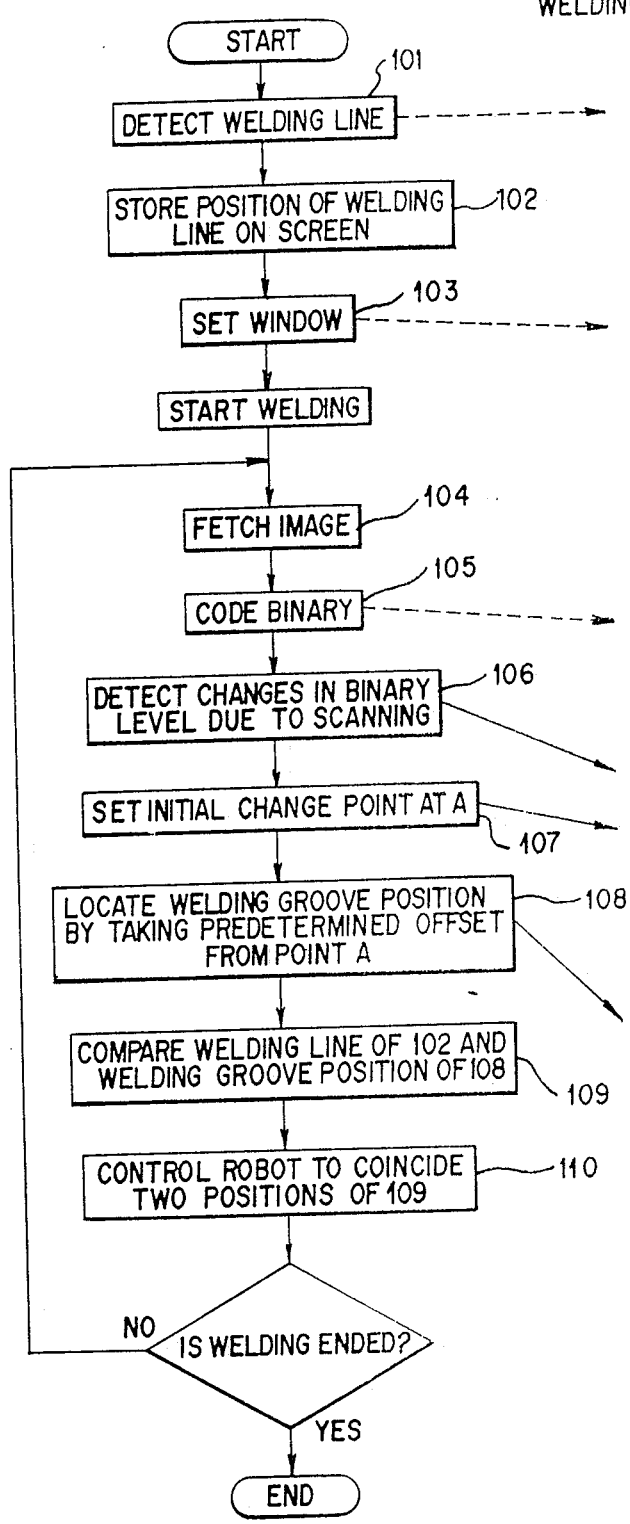
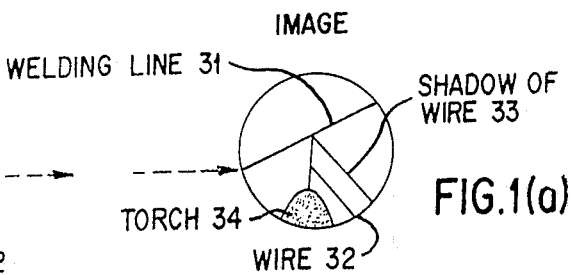
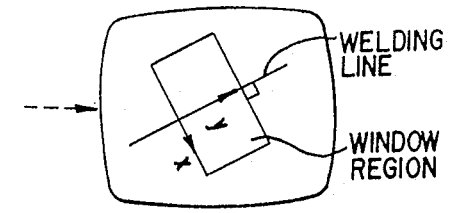
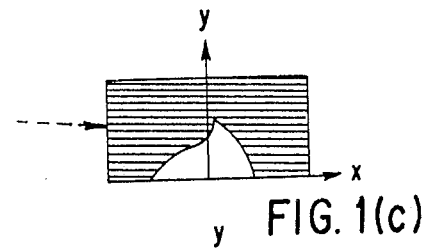
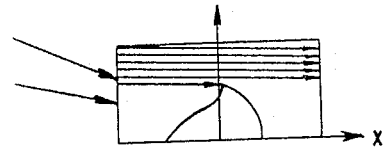
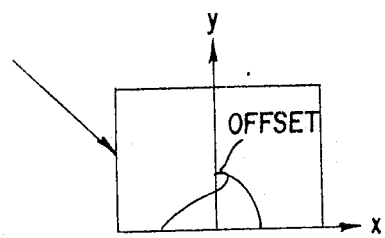
FIG.1

WELDING DIRECTION

WELDING DIRECTION

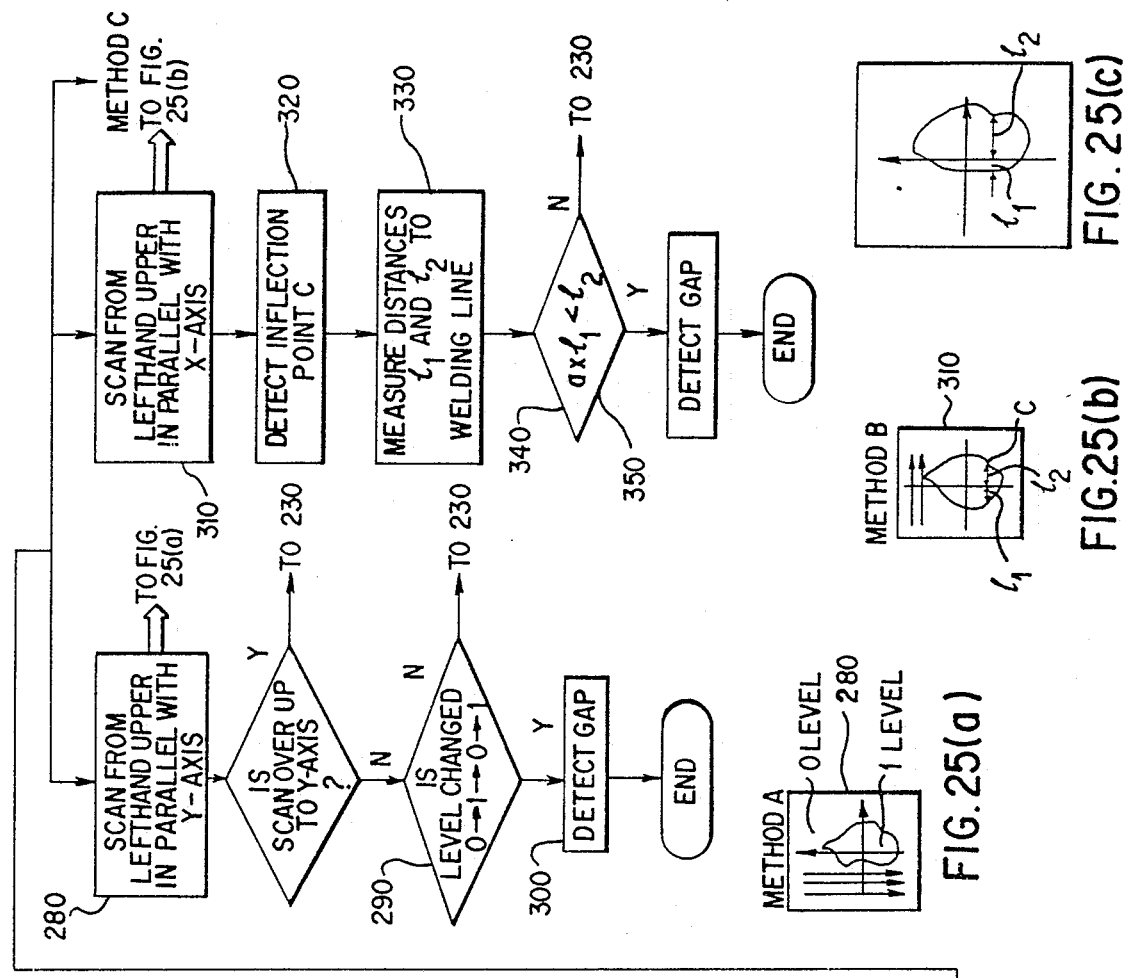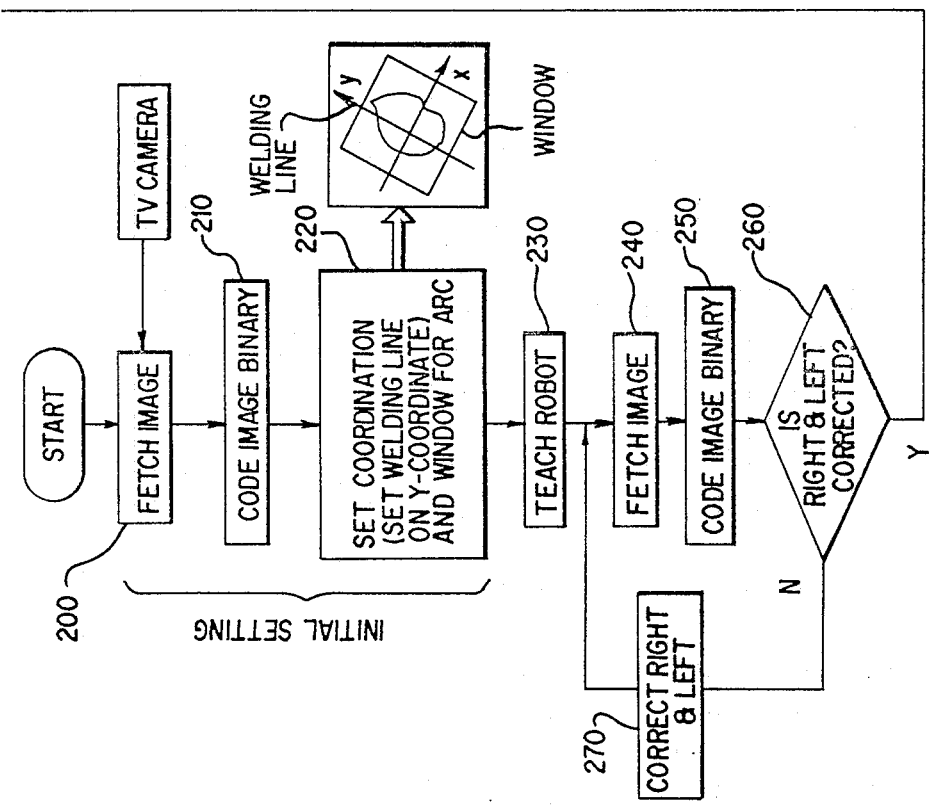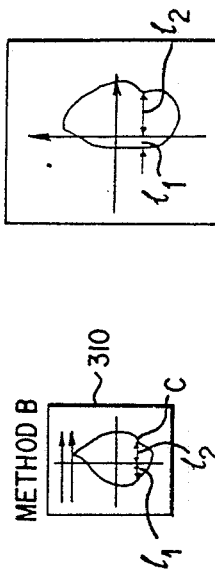
FIG. 25
FIG. 25(a)
FIG. 25(b)
FIG. 25(c)

Arc upon Gap Detection

POSITIONAL INFORMATION DETECTING METHOD IN ARC WELDING

TECHNICAL FIELD

The present invention relates to a method to be used in an arc welding for detecting positional information such as a welding groove position, a welding torch height, a welding start point, a welding end point, an external or internal corner point, a work contact point of a welding wire or a welding groove gap by monitoring the shape and/or position of a welding arc.

BACKGROUND TECHNIQUE

In the prior art, a method has been known for controlling the welding position and condition or the like of the arc welding by picking up the image of a portion to be welded such as a molten metal, a welding tip, a wire or a welding groove with the use of industrial TV camera (ITV) and by analyzing the image picked up.

However, the arc flame has a more intense brightness than that of the surroundings (e.g., the molten metal) and contains much infrared and ultraviolet rays so that difficult problems are encountered in detecting the welding portion Therefore, the following solutions have been worked out in the prior art.

One solution is to devise an image pickup or an optical filter. In Japanese Patent Laid-Open No. 51-72938, for example, the radiation from the portion being welded is transmitted only in the visible and near infrared ranges by providing filters for limiting infrared rays, heat rays, colors and quantities of light, respectively, and by using a silicon vidicon image pickup tube in the TV camera. In Japanese Patent Laid-Open No. 59-212172, on the other hand, the image is picked up by an infrared TV camera through an infrared filter. In Japanese Patent Laid-Open No. 58-159980, moreover, the filter is dispensed with by using a CCD (i.e., a charge-coupled device or solid image sensor) as the image pickup device.

Another method for solving the influences of the arc is to provide a high-speed shutter in the industrial TV camera. In Japanese Patent Laid-Open No. 58-7776, for example, the shutter is opened only upon short-circuiting of the arc by catching the chance of arc disappearance. In Japanese Patent Laid-Open No. 59-202178, on the other hand, the shutter is opened in the pulse welding operation only when the arc attenuates at the timing of a base current.

Still another method for picking up the image of a portion being welded while discriminating the arc is to provide a light source for the image pickup. In Japanese Patent Laid-Open No. 55-42185, for example, the light source has a spectral distribution different from that of a disturbance light such as the arc, and the wavelength to be detected falls within a wavelength range in which the quantity of the disturbance light is smaller than that of the light source. In Japanese Patent Laid-Open No. 59-191574, on the other hand, a light source is provided for projecting a beam forward of the running direction of a welding torch to represent the image of the welding groove in a contour defined by shadows.

What can be commonly said among the various prior art examples described above is to separate and remove the image to be picked up and the arc partly because the object to be picked up is the portion to be welded such as the molten metal and partly because the arc is the disturbance light obstructing the image pickup.

Since, however, the arc has a high intensity and a wavelength covering substantially the whole range, it can hardly be completely removed, and the system therefor has to become complex and expensive.

In the case of narrow gap welding operation, on the other hand, some example monitors the arc itself. In Japanese Patent Laid-Open No. 55-45554, for example, the luminance distribution of the arc is determined to locate the center of rotations of the welding core wire in the gap. In Japanese Patent Laid-Open No. 58-187268, on the other hand, the movement of the torch is controlled by providing an optical detector at the leading end of the torch and by comparing the outputs of the detector.

However, the above examples are limited to the narrow gap welding operations but cannot be applied to the lap, fillet and butt joint welding operations the present invention aims at.

A first object of the present invention is to solve the various problems thus far described and to detect the groove position of an arc welding by observing the arc itself without adding any special device.

Since, on the other hand, the wire is let off from the welding torch obliquely with respect to the normal plane, its leading end will fail to follow the welding line so that precision welding cannot be expected, unless the height of the welding torch is properly positioned. Hence, the control of the height of the welding torch is an important factor for precision welding.

Thus, a second object of the present invention is to accomplish high precision welding by detecting whether or not the height of the welding torch is proper, by the use of a binary image obtained through direct observation of the arc.

In the prior art, as has been described hereinbefore, efforts have been made to eliminate the influences of the arc by all means from the image picked up. However, the arc has a high intensity and a wavelength covering substantially the whole range so that the influences of the arc can hardly be completely eliminated. If possible, however, it is seriously difficult to take the image by using the industrial TV camera commercially available. If, moreover, the welding end point or the corner point is to be detected by analyzing the taken image such as the molten metal, this detection has to be accompanied by complicated analyses. Of these, it is necessary to discriminate whether welding port has reached the end point or the corner point or has gone out of position.

On the other hand, the sensor using an external light source such as a laser beam is almost compatible with a method of detecting the step of the welding groove with linear information (e.g., a slit beam). This makes it impossible to stably detect the welding end point or the corner point. Thus, the method of the laser beam or wire contact type cannot detect errors caused by the thermal strain of the welding operation.

A third object of the present invention is to detect the welding end point and the internal and external corner points of the lap and fillet joint welding operations by detecting the arc in the visible range with an existing industrial TV camera, requiring neither any external light source such as a laser nor any special device for separating and removing the arc, and by analyzing the pattern of the arc.

Contrary to the aforementioned prior art method of detecting the welding position, the method of detecting the welding groove gap is exemplified by detecting changes in the step of the work by the use of the laser beam. Despite this fact, however, there exists no method of detecting the changes in the height of the step of the work from the image picked up during the welding operation by the industrial TV camera. On the other hand, there are a number of problems with the method of detecting the gap through the direct image pickup because the arc is far more intense in luminance than the surrounding light.

There is another method of burying the gap detected. However, mere changes in the welding conditions (e.g., the current, voltage and rate) would make it difficult to set the welding conditions, because of the problem of burning through the work, and would reduce the allowance for the gap. In still another method, the gap is buried by the weaving process using an automatic welder. This method cannot deal with the real-time changes in the size of the gap due to the thermal strain during the welding operation.

A fourth embodiment of the present invention is to solve the various problems described above and to accomplish the adaptability control of the groove gap by directly observing the arc itself without any special device to recognize the pattern thereby to detect the welding groove gap.

In the automatic welding operation using a robot, the detection of the work contact of the welding wire is necessary for detecting the welding start point.

In one method of detecting the contact of the wire with the work, this contact is detected in terms of electric conduction.

Specifically, a power supply circuit is prepared between the welding torch and the work, and the wrist of the robot is moved in horizontal and vertical directions, as shown in FIG. 31. The power supply circuit is established when a conductive wire 5 projecting from a welding torch 4 comes into contact with the wall 7a or 7b of a work 7. The point intersecting the wall, i.e., a welding start point A is detected by storing the horizontal and vertical coordinates Px and Py in the robot.

However, this method of detecting the wire contact in terms of the electric conduction may fail to electrically detect the merely physical contact of the wire and the work, because this contact is electrically insulated if the wire or work is covered with an oxide film such as rust. In order to eliminate the influences of the insulating film, therefore, a high power source is required in the circuit so as to break down the insulation.

A further method is to detect the welding start point by processing the image with the CCD camera. Since the information of the CCD camera is two-dimensional, the method is defective in that the accuracy in the vertical direction is insufficient although the accuracy in the horizontal direction is acceptable.

A fifth object of the present invention is to detect the contact of the wire with the work in terms of image information.

Now, generally speaking, the control point of the welding robot falls at the tip of the electrode wire which is fed from the leading end of the welding torch carried by the wrist. The locus is so controlled and corrected that the desired locus may be followed by the tip of the electrode wire having a desired length.

It is necessary for starting the welding operation to detect the position of the wire of the welding robot at present. This detection of the welding start point is accomplished by either a method of detecting the displacement of the work by holding the welding wire in touch with the work or a method of monitoring the distance between the robot and the work with the laser beam.

However, the former method of having the wire touching the work is influenced by the state of the tip of the welding wire so that it finds it difficult to detect the displacement of the work within an accuracy of 1 mm or less.

On the other hand, the latter method using the laser beam has to be accomplished by an expensive system which is difficult to set. Another difficulty of this system is the use as a robot sensor in the field.

A sixth embodiment of the present invention is to detect the welding start point with high accuracy by neither changing the relative positions of the camera, the light source and the welding torch nor requiring any wiring inching and to construct the system at a reasonable cost.

DISCLOSURE OF THE INVENTION

When arc welding is to be accomplished along a welding groove position being detected, according to the present invention, the image of the shape of an arc is picked up by an image pickup device from above the joint portion of members to be welded. The arc shape thus picked up is binary-coded. This arc shape presents a unique pattern depending upon the various welding conditions so that the various singular points are detected in the present invention. Specifically, the welding groove position is detected by analyzing the singular points of the contour of the binary arc shape. The height of the welding torch is detected in terms of the shape and position of the arc. Also detected are the singular point on the welding line and the welding groove gap through the pattern analysis of the binary arc shape. In the welding operation, moreover, the shadow of the wire is observed in the binary image to detect the welding start point. The contact of the wire with the work is also detected in terms of the changes in the image of the tip of the wire.

BRIEF DESCRIPTION OF THE DRAWINGS

FIG. 1 is a flow chart diagram for carrying out the first embodiment of the present invention;

FIG. 1(a) is a schematic diagram of the image of the welding line detected by the image pickup device;

FIG. 1(b) is a schematic diagram of the window illustrating the region of the image to be processed;

FIG. 1(c) is a schematic diagram of the image that is binary-coded;

FIG. 1(d) is a schematic diagram illustrating horizontal scanning of the window;

FIG. 1(e) is a schematic diagram showing the offset of the image;

FIG. 11(a) is a schematic diagram of the image of the welding line detected by the image pickup device;

FIG. 11(b) is a schematic diagram of the window illustrating the region of the image to be processed;

FIG. 11(c) is a schematic diagram of the image that is binary-coded;

FIG. 11(d) is a schematic diagram illustrating horizontal scanning of the window;

FIG. 11(e) is a schematic diagram showing the offset of the image;

FIG. 12(a2) is a schematic diagram of the arc produced with the operation of FIG. 12(a1);

FIG. 12(b1) is a schematic view illustrating the torch height above the proper position;

FIG. 12(b2) is a schematic diagram of the arc produced with the operation of FIG. 12(b1);

FIG. 12(c1) is a schematic view illustrating the torch height at a position lower than the proper position;

FIG. 12(c2) is a schematic diagram of the arc produced with the operation of FIG. 12(c1);

FIG. 13(a2) is a schematic diagram of the arc produced with the operation of FIG. 13(a1);

FIG. 13(b1) is a schematic diagram of a fillet welding operation with the torch height above the proper position;

FIG. 13(b2) is a schematic diagram of the arc produces with the operation of FIG. 13(b1);

FIG. 13(c1) is a schematic diagram of a fillet welding operation in which the torch is at a position lower than the proper position;

FIG. 13(c2) is a schematic diagram of the arc produced with the operation of FIG. 13(c1);

FIG. 14(a2) is a schematic view of the arc produced with the operation of FIG. 14(i a1);

FIG. 14(b1) is a schematic view of a butt joint welding operation in which the torch is at a height higher than the proper position;

FIG. 14(b2) is a schematic diagram of the arc produced with the operation of FIG. 14(b1);

FIG. 14(c1) is a schematic view of a butt joint welding operation in which the torch is at a height lower than the proper position;

FIG. 14(c2) is a schematic diagram of the arc produced with the operation of FIG. 14(c1);

FIG. 25 is a flow chart diagram showing a gap detecting method according to the present invention;

FIG. 25(a) is a schematic view of the arc produced when the scan is performed from the left-hand, upper corner in parallel with the Y-axis;

FIG. 25(b) is a schematic view of the arc produced when the scan is performed from the left-hand, upper corner in parallel with the X-axis;

FIG. 25(c) is a schematic view of another arc that is produced;

FIG. 27(a) is a schematic diagram used for illustrating when synchronization is first taken at the instant of "left max" to fetch the image during the robot weaving operation;

FIG. 27(b) is a schematic view of the arc produced in the operation of FIG. 27(a);

FIG. 27(c) is a schematic view of an arc produced when synchronization is taken at the instance of "right max" to pick up the image;

FIG. 27(d) is a schematic diagram of the apparatus in which synchronization is taken at the instant of "right max" to pick up the image;

BEST MODE FOR CARRYING OUT THE INVENTION

The first invention for achieving the first object of the present invention will be described in the following.

We have first repeated the simple experiments of picking up the image of the lap joint welding situation by disposing a TV camera over the portions to be welded but have succeeded in recognizing only the contour of the arc in the TV screen due to the high intensity of the arc. We have found that because of the presence of the joint step on the welding line the arc itself is stepped on such welding line in front of the torch not yet filled by the bead, thus representing a characteristic shape in a portion of the contour of the shape of the image picked up with the arc.

We have also confirmed that this phenomenon occurs in the cases of the fillet and butt joint welding operations, too.

On the basis of the above findings, noting the arc itself which has been thought to be eliminated as the disturbance light in the prior art, the present invention aims at locating the welding groove position by picking up the image of the shape from above the arc in the joint portions and by analyzing that shape.

Figure 3:
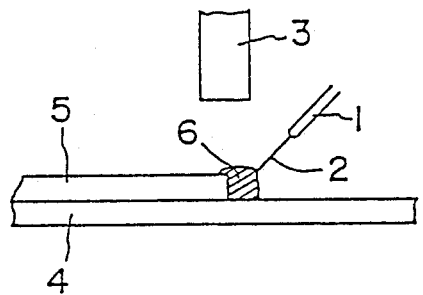
FIG. 3 is a schematic view showing an example of lap joint welding.

FIG. 3 shows an example of the lap joint welding, in which: reference numeral 1 designates a torch; numeral 2 a wire; numeral 3 an image pickup device; numerals 4 and 5 members to be welded; and numeral 6 an arc.

Incidentally, let it be assumed that the torch 1 is moving in the forward direction (toward the back of the drawing) while splashing the arc.

Figure 4:
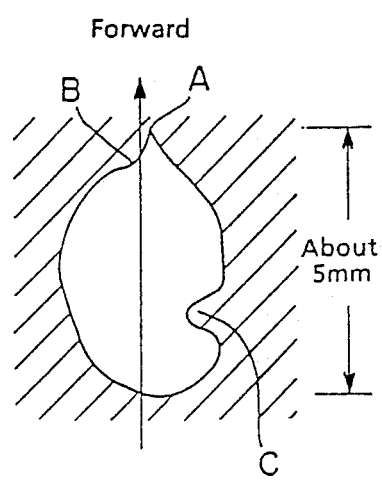
FIG. 4 is a schematic diagram showing a binary-coded state of an arc pickup in the same welding operation.

At this time, the image picked up by the pickup device 3 is binary-coded, as illustrated "white" in the arc portion and "black (or hatched)" in the remainder in FIG. 4.

Figure 5:
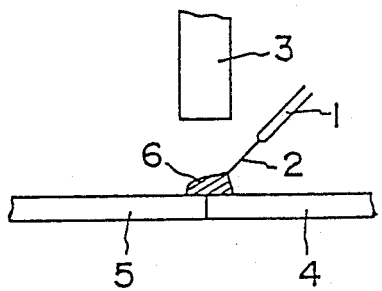
FIG. 5 is a schematic view showing an example of butt joint welding without any gaps.
Figure 6:
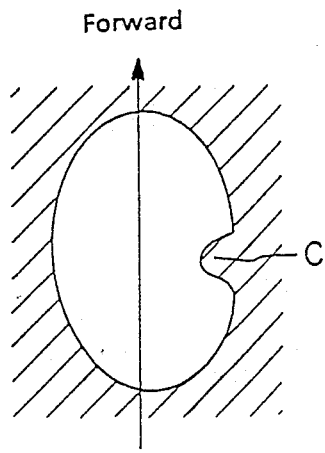
FIG. 6 is a schematic diagram showing a binary-coded image of the arc of the butt joint welding operation.

For comparisons, the case of the butt joint welding without any gap is shown in FIG. 5, and the image picked up and binary-coded is shown in FIG. 6.

The comparison of FIGS. 4 and 6 reveals that the bulge (as indicated at A) and the dent (as indicated at B) exhibit the characteristics of FIG. 4.

Specifically, the members to be welded at the forward side (i.e., the upper half of FIG. 4) naturally have a step because they are not as yet welded, whereas the welded portions (i.e., the lower half of FIG. 4) have their step filled with the bead In other words, the bulge (A) and the dent (B) are formed by the step at the forward side Despite this fact, however, points A and B are instantly detected even if the welding operation has not yet proceeded, but are not soon detected because they are filled with the bead. This means that the position of point A or B has a predetermined relation to the welding line so that the welding line (or the welding groove position) can be detected if that point can be recognized.

Incidentally, a large bulge C located at the righthand side of FIGS. 4 and 6 is formed by the shadow of the wire 2.

Figure 7:
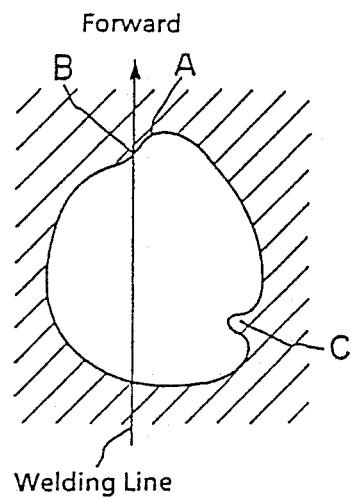
FIG. 7 is a schematic diagram showing the binary-coded image of an arc in a fillet joint welding operation.
Figure 9:
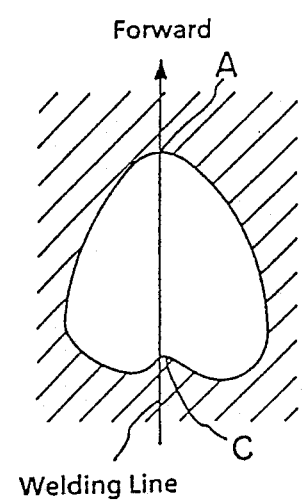
FIG. 9 is a schematic diagram showing the binary-coded image of an arc in a V-type butt joint welding operation.
Figure 8:
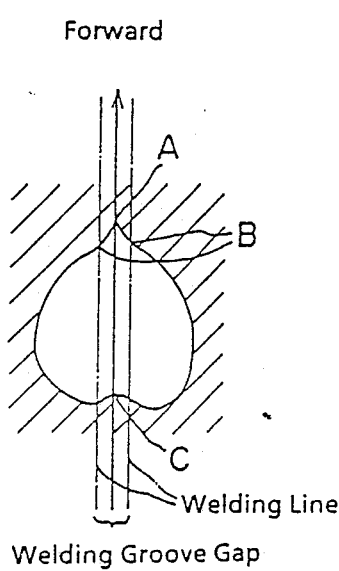
FIG. 8 is a schematic diagram showing the binary-coded image of an arc in an I-type butt joint welding operation.

On the other hand, FIGS. 7, 8 and 9 show the arcs of the fillet joint welding operation, the I-type butt joint welding operation, and the V-type butt joint welding operation like FIG. 4.

Figure 2:
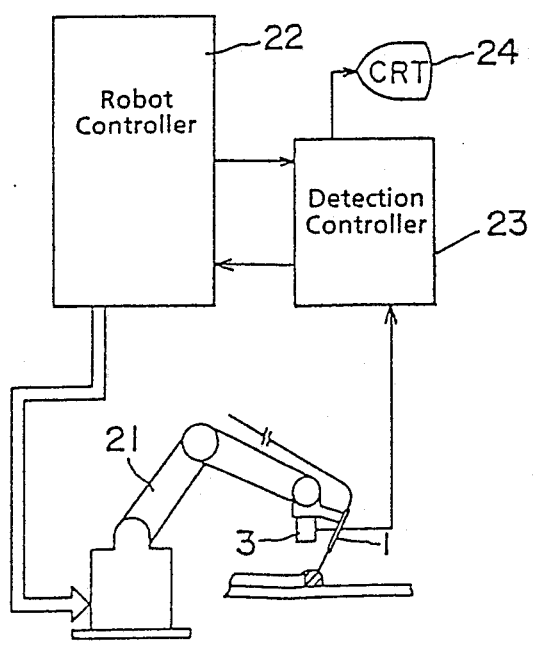
FIG. 2 is a diagram showing the construction of a system for carrying out the present invention.
Figure 10:
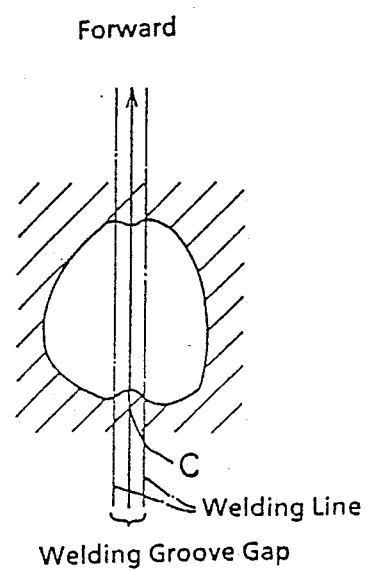
FIG. 10 is a schematic diagram of the binary-coded image of an arc in an I-type butt joint welding operation in the absence of backing.

The arc of the I-type butt joint welding has its tip extending, as shown in FIG. 8, when there is backing but moves to the back of the unwelded members from the gap of the joints with the absence of backing to take a dented shape, as shown in FIG. 10. FIG. 2 shows an example of the construction for carrying out the present invention. In FIG. 2: reference numeral 21 designates a robot; numeral 22 a robot controller, numeral 23 a detection controller; and numeral 24 a CRT display device.

The torch 1 and the image pickup device 3 are carried on the wrist of the robot 21 so that the point of view of the image pickup device follows the movements of the torch 1 to pick up the image always at the relatively identical position. This is performed to facilitate the image processing. The image pickup device 3 is constructed of the CCD camera or the like, and the image picked up thereby is processed by the detection controller 23 in response to the start instruction of the robot controller 22 and is displayed on the CRT display device 24.

The detection controller 23 executes the processing to locate the welding groove position in response to the welding start instruction of the robot controller 22. If the torch 1 falls out of the position located, the detection controller 23 issues a correcting instruction to the robot controller 22 to correct the torch position.

When the robot controller 22 issues the welding end instruction, the detection controller 23 ends the process of locating the welding groove position.

The description thus far made is directed to one example of the schematic construction for carrying out the present invention.

Next, the method of locating the welding groove position specifically will be described by taking up as an example the case of the fillet joint welding operation shown in FIG. 3. FIG. 1 presents the flow chart for the processing.

The detection controller 23 first detects the welding line (at step 101 of FIG. 1). This detection is made from the image picked by the image pickup device 3. This image is shown in FIG. 1(a), in which are projected a welding line 31, a wire 32, a wire shadow 33 and a torch 34 The welding line 31 is one on which the two members to be welded contact.

Next, the position of the welding line on a screen (i.e., on the coordinates set on the frame) is stored (at step 102 of FIG. 1).

Then, a window (i.e., a region of the image to be processed) is set with respect to the welding line (at step 103 of FIG. 1).

This window is set to include the portion having the unique shape with the welding line on a Y axis, as shown in FIG. 1(b).

The steps described above are to be accomplished in advance.

When the robot controller issues the welding start instruction, the detection controller 23 obtains the image data (at step 104 of FIG. 1).

Then, the image picked up is stored in a video RAM and is binary-coded white in the arc portion and black in the remainder (at step 105 of FIG. 1, as shown in FIG. 1(c)).

Then, the window is scanned horizontally from above the lefthand side, as shown in FIG. 1(d), to detect changes in the binary level (at step 106 of FIG. 1). The first changing point A of the first binary level presents either the welding groove position or the reference point for calculating the former (at step 107 of FIG. 1).

This point A moves with the welding point, while maintaining a predetermined offset with respect to the welding line. The welding groove position can be detected by locating that point A (at step 108 of FIG. 1, as shown in FIG. 1(e)).

Therefore, the welding line stored in advance on the screen is compared with the welding groove position obtained from point A or the singular point of the arc (at step 109 of FIG. 1). The wire tip can be caused to follow the welding groove position by controlling the robot (at step 110 of FIG. 1) to align the welding groove position obtained from point A with the welding line stored on the screen.

Incidentally, the offset is a constant determined according to the welding conditions and the angle between the image pickup device and the torch and is found to be within about 0.6 mm according to our experimental results.

Thus, in this first invention, the portions to be welded are detected by using the arc itself as the object for detecting the welding groove position and by analyzing the singular point of the contour of the arc. This makes it unnecessary to use an expensive external light source such as a laser thereby remarkably simplifying the construction. Moreover, the arc itself is an intense light source so that it is hardly influenced by any other light thus eliminating the need for any special cut-off filter or band-pass filter, but it is sufficient to use a welding filter for reducing the quantity of light. Nor is required any shutter for synchronization when the base current for the pulse welding operation to be used in the system deeming the arc as the disturbance light is supplied or when the arc is short-circuited. As a result, no restriction is made by the type of the welder or the wire, the welding conditions and so on. Since no special wavelength of the arc is observed, no restriction is made by the specification of the TV camera, but an existing CCD (having a sensitivity falling within a visible range from 300 to 1,000 nm) can be used. Because of the pattern analysis of the arc, moreover, the detection can be accomplished even for the lap joint welding operation of a thin plate of 1 mm or less.

As should be noted here, the arc has such a small diameter of about 5 mm that no attention has been paid to the minute image of the arc in the prior art, thus naturally affording no information on the unique shape.

Therefore, the present invention can be said to be an outstanding one for locating the welding groove position because it notes that the image of the arc is shaped to have a predetermined relation to the welding line.

Next, the second invention for achieving the second object of the present invention will be described in the following.

We have first repeated the simple experiments of picking up the image of the lap joint welding situation by disposing a TV camera over the portions to be welded but have succeeded in recognizing only the contour of the arc in the TV screen due to the high intensity of the arc. We have found that because of the presence of the joint step on the welding line the arc itself is stepped on such welding line in front of the torch and is not filled with the bead, thus representing a characteristic shape in a portion of the contour of the shape of the image picked up with the arc.

We have also confirmed that this phenomenon occurs in the cases of the fillet and butt joint welding operations, too.

On the basis of the above findings, noting the arc itself which has been thought to be eliminated as the disturbance light in the prior art, the present invention aims at determining the height of the welding torch by picking up the image of the shape from above the arc in the joint portions and by analyzing the shape and position.

The construction for observing the arc in the welding operation with an image pickup device such as the TV camera is shown in FIG. 3. FIG. 3 shows an example of the lap joint welding, in which: reference numeral 1 designates a torch; numeral 2 a wire; numeral 3 an image pickup device; numerals 4 and 5 members to be welded; and numeral 6 an arc. Incidentally, let it be assumed that the torch 1 is moving in the forward direction (toward the back of the drawing) while splashing the arc.

At this time, the image picked up by the pickup device 3 is coded binary, as illustrated "white" in the arc portion and "black (or hatched)" in the remainder in FIG. 4.

Specifically, the members to be welded at the forward side (i.e., the upper half of FIG. 4) naturally have a step because they are not welded yet, whereas the welded portions (i.e., the lower half of FIG. 4) have their step filled with the bead.

In other words, the bulge (A) and the dent (B) are formed by the step at the forward side. Despite this fact, however, the points A and B are instantly detected even if the welding operation has not proceeded yet, but are not soon detected because they are buried with the bead. This means that the position of point A or B has a predetermined relation to the welding line so that the welding line (or the welding groove position) can be detected if that point can be recognized.

Incidentally, a large bulge C located at the righthand side of FIGS. 4 and 6 is formed by the shadow of the wire 2.

Now, unless the torch height is proper, the arc to splash from the tip of the wire 2 will change its shape.

Figure 12:
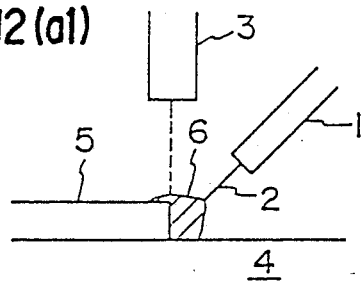
FIG. 12(a1) is a schematic view of the welding operation with the torch at the proper height.
Figure 12:
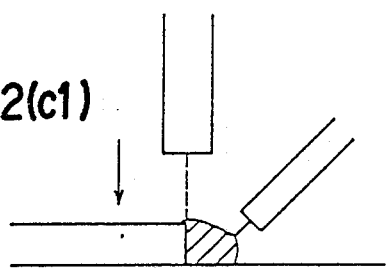
Figure 12:
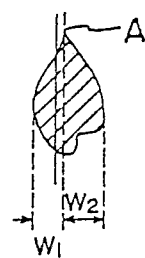
Figure 12:
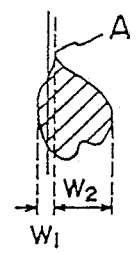
Figure 12:
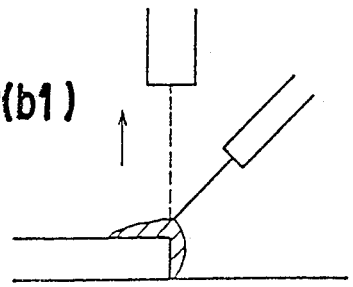
Figure 12:
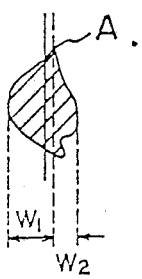

FIG. 12 illustrates the relations between the torch height and the binary pattern of the arc in the case of the lap joint welding operation. FIG. 12(a1) presents the case in which the torch has a proper height, and FIG. 12(a2) presents the arc pattern of that case. If the torch is above the proper position, as shown in FIG. 12(b1), the arc spreads over the upper surface of the member 5 to be welded so that the width $W_1$ at the lefthand side of the singular point A of the arc grows larger than that of the case (a2), as shown in FIG. 12(b2). If the torch height is lower than the proper position, as shown in FIG. 12(c1), the width $W_2$ at the right hand side of the singular point A grows larger than that of the case (a2), as shown in FIG. 12(c2).

Thus, whether or not the height of the torch is proper can be detected by analyzing the changes in the shape and width of the arc.

Figure 13:
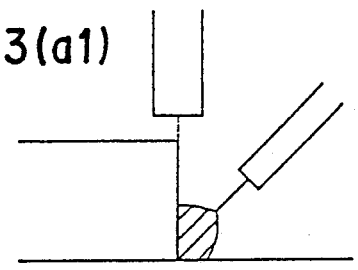
FIG. 13(a1) is a schematic diagram of a fillet welding operation with the torch at the proper height.
Figure 13:
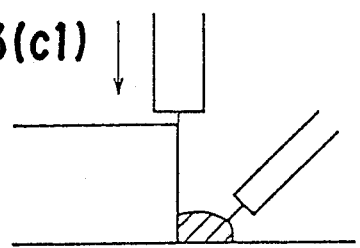
Figure 13:
Figure 13:
Figure 13:
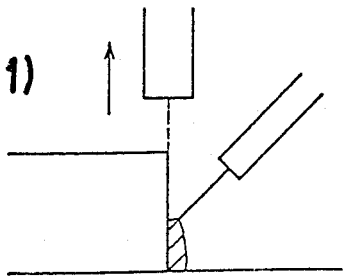
Figure 13:
Figure 14:
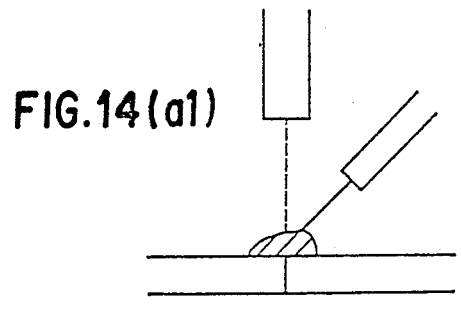
FIG. 14(a1) is a schematic view of a butt joint welding operation in which the torch is at the proper height.
Figure 14:
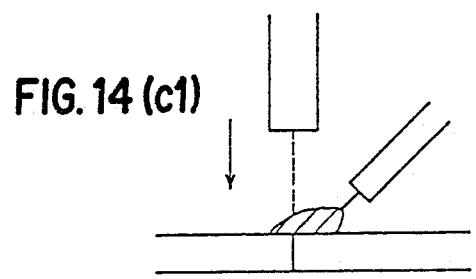
Figure 14:
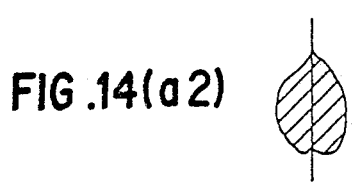
Figure 14:
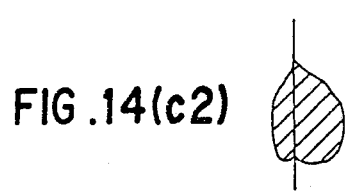
Figure 14:
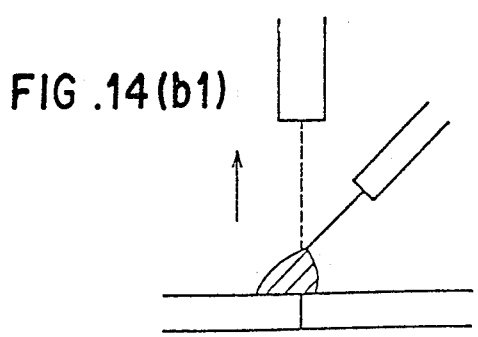
Figure 14:
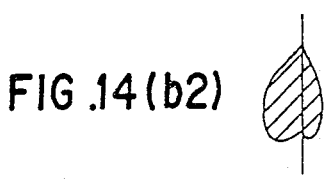

FIGS. 13 and 14 illustrate the cases of the fillet and butt joint welding operations, respectively, like FIG. 12.

FIG. 2 shows an example of the construction for carrying out the present invention. In FIG. 2: reference numeral 21 designates a robot; numeral 22 a robot controller, numeral 23 a detection controller; and numeral 24 a CRT display device.

The torch 1 and the image pickup device 3 are carried on the wrist of the robot 21 so that the point of view of the image pickup device follows the movements of the torch 1 to pick up the image always at the relatively identical position.

This is performed to facilitate the image processing.

The image pickup device 3 is constructed of the CCD camera or the like, and the image picked up thereby is processed by the detection controller 23 in response to the start instruction of the robot controller 22 and is displayed in the CRT display device 24.

The detection controller 23 executes the processing to locate the welding groove position in response to the welding start instruction of the robot controller 22. If the torch 1 falls out of the position located, the detection controller 23 issues a correcting instruction to the robot controller 22 to correct the torch position.

When the robot controller 22 issues the welding end instruction, the detection controller 23 ends the processing of locating the welding groove position.

Figure 11:
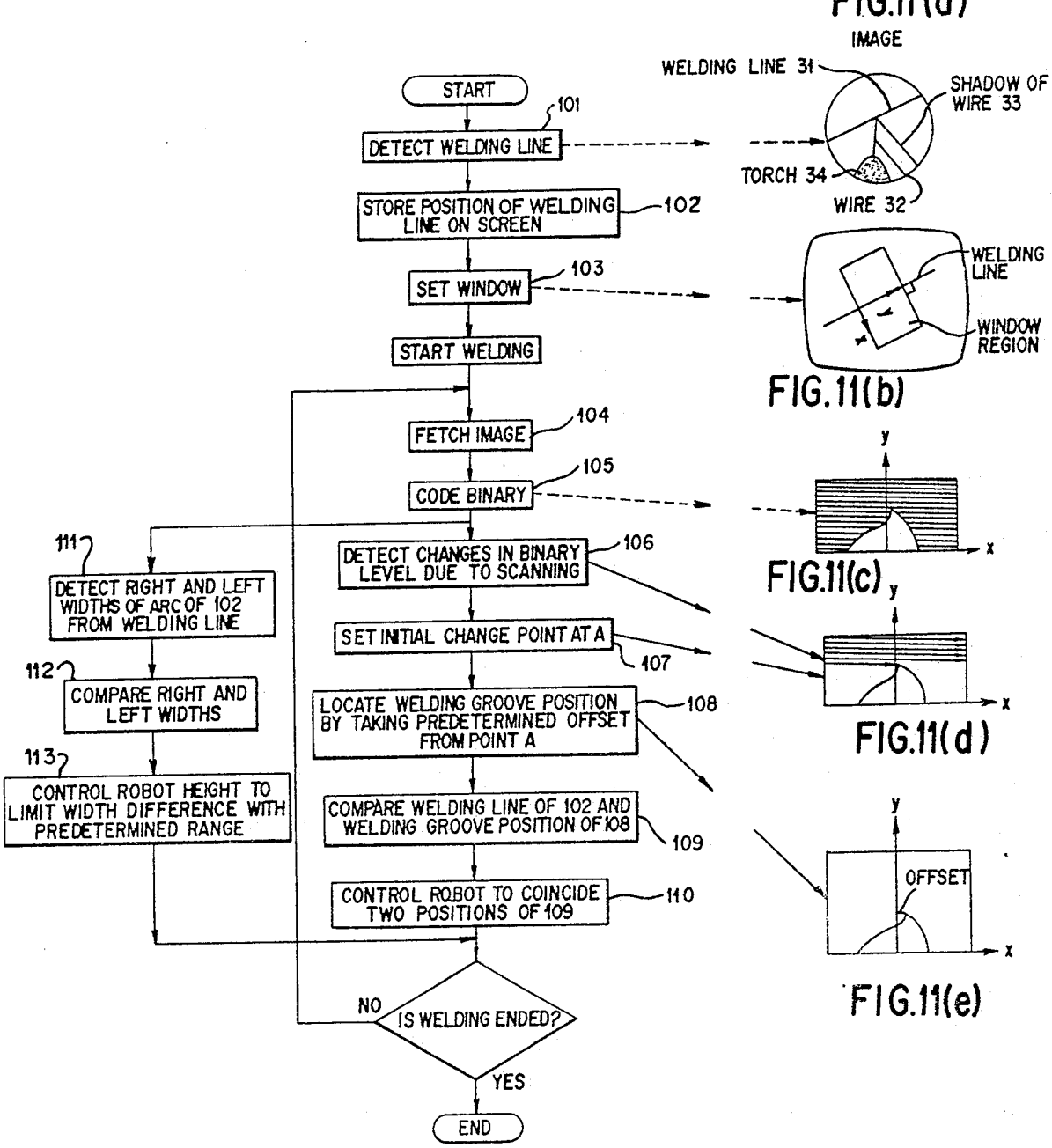
FIG. 11 is a flow chart diagram for carrying out a second embodiment of the present invention.

Next, the method of locating the welding groove position specifically will be described by taking up as an example the case of the fillet joint welding operation shown in FIG. 3. FIG. 11 presents the flow chart for the processing.

The detection controller 23 first detects the welding line (at step 101 of FIG. 11). This detection is made from the image picked by the image pickup device 3. This image is shown in FIG. 11(a), in which are projected a welding line 31, a wire 32, a wire shadow 33 and a torch 34. The welding line 31 is one on which the two members to be welded contact.

Next, the position of the welding line on a screen (i.e., on the coordinates set on the frame) is stored (at step 102 of FIG. 11).

Then, a window (i.e., a region of the image to be processed) is set with respect to the welding line (at step 103 of FIG. 11).

This window is set to include the portion having the unique shape with the welding line on a Y axis, as shown in FIG. 11(b).

The steps described above are to be accomplished in advance.

When the robot controller 22 issues the welding start instruction, the detection controller 23 fetches the image data (at step 104 of FIG. 11).

Then, the image picked up is latched in a video RAM and is binary-coded white in the arc portion and black in the remainder (at step 105 of FIG. 11, as shown in FIG. 11(c)).

Then, the window is scanned horizontally from above the lefthand side, as shown in FIG. 11(d), to detect changes in the binary level (at 106 of FIG. 11). The first changing point A of the first binary level presents either the welding groove position or the reference point for calculating the former (at step 107 of FIG. 11).

This point A moves with the welding point, while maintaining a predetermined offset with respect to the welding line. The welding groove position can be detected by locating that point A (at step 108 of FIG. 11).

Therefore, the welding line stored in advance on the screen is compared with the welding groove position obtained from point A or the singular point of the arc (at step 109 of FIG. 11). The wire tip can be caused to follow the welding groove position by controlling the robot (at step 110 of FIG. 11) to align the welding groove position obtained from point A with the welding line stored on the screen.

Incidentally, the offset is a constant determined according to the welding conditions and the angle between the image pickup device and the torch and is found to be within about 0.6 mm according to our experimental results.

The welding groove position is located at either point A or a point offset from point A by a predetermined distance.

Moreover, the detection of the torch height the present invention aims at is accomplished, as follows, by using the binary image.

As shown in FIG. 11, after the binary coding at the step 105, the righthand and lefthand widths of the arc from the arc, which have been obtained at the step 102, are detected (at step 111 of FIG. 11). Next, the sizes of the righthand and lefthand widths (as indicated at $W_2$ and $W_1$ in FIG. 12) are compared (at step 112 of FIG. 11). Then, the height of the robot is so controlled that the width difference may fall within a predetermined range (at step 113 of FIG. 11).

In these ways, the binary-coded image pattern is analyzed to detect the height of the welding torch so that the robot may be controlled to have a proper height to accomplish the precision welding.

In the second invention of the present invention, as has been described hereinbefore, the torch height is detected simultaneously with the welding groove position by making use of the binary pattern of the arc.

This makes it unnecessary to use another special device for detecting the height so that the system can be remarkably simplified. The arc itself provides an intense light source and is hardly influenced by any other light, and the existing welding filter or the like for reducing the quantity of light may be used without requiring any special cut-off filter, band-pass filter or the like.

Next, the third invention for achieving the third object of the present invention will be described in the following.

We have first repeated the simple experiments of picking up the image of the lap joint welding situation by disposing a TV camera over the portions to be welded but have succeeded in recognizing only the contour of the arc in the TV screen due to the high intensity of the arc. We have found that because of the presence of the joint step on the welding line the arc itself is stepped on such welding line in front of the torch and as is not filled with the bead, thus representing a characteristic shape in a portion of the contour of the shape of the image picked up with the arc.

We have also confirmed that this phenomenon occurs in the cases of the fillet and butt joint welding operations, too.

On the basis of the above findings, noting the arc itself which has been thought to be eliminated as a disturbance light in the prior art, the present invention aims at locating a singular point on the welding line by picking up the image of the shape from above the arc in the joint portions and by analyzing that shape.

Figures 15, 15A, 15B:
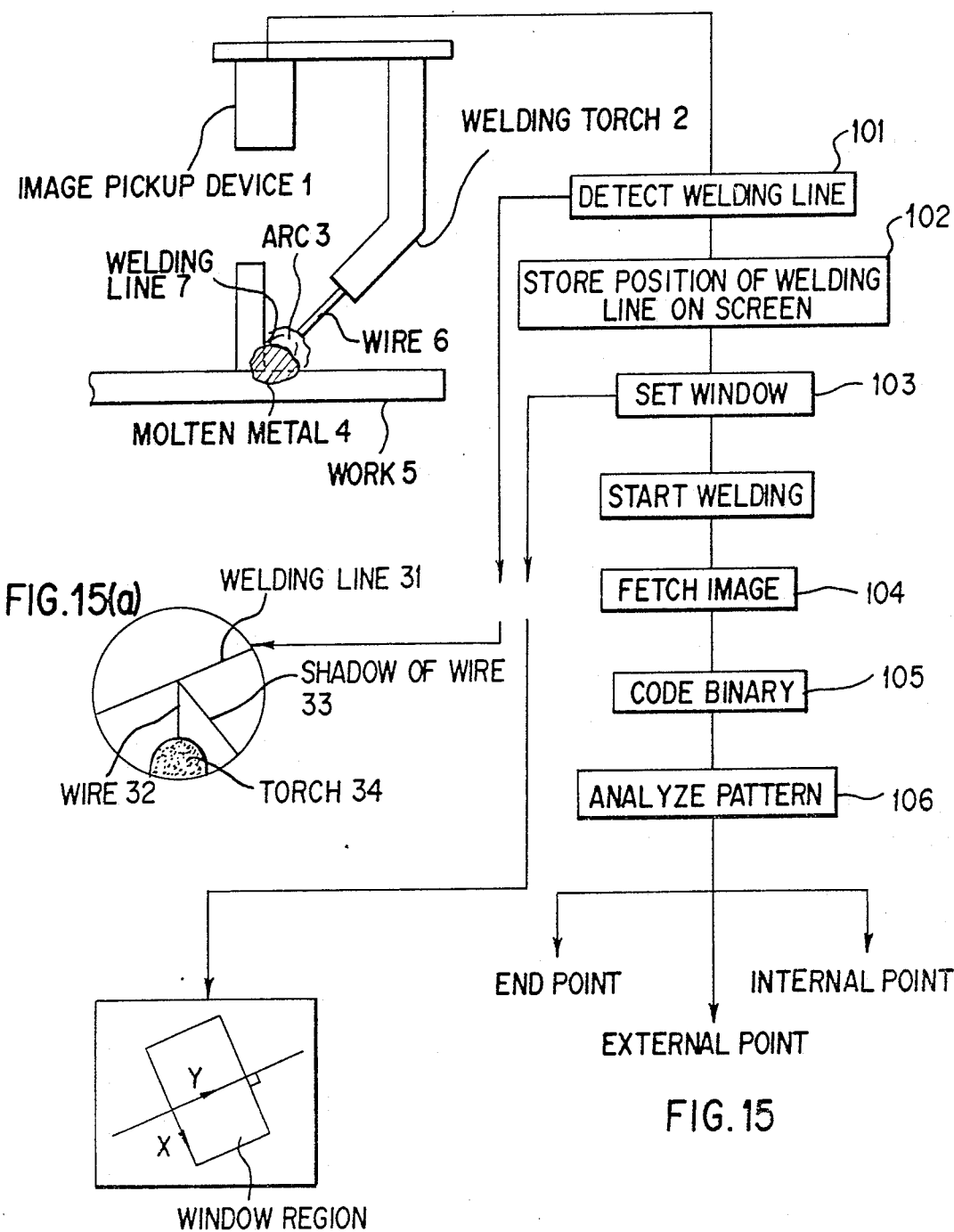
FIG. 15 is a block diagram of a lap joint welding operation according to a third embodiment of the present invention.
FIG. 15(a) is a schematic diagram of the detected image from the image pickup device of FIG. 15.
FIG. 15(b) is a schematic diagram of the window produced with the apparatus of FIG. 15.
Figure 16:
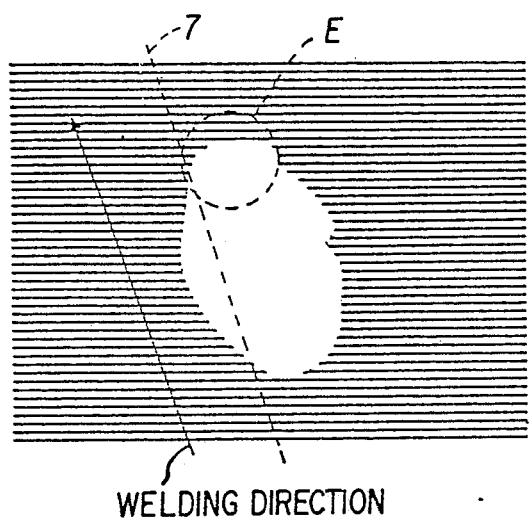
FIG. 16 is a schematic diagram illustrating the state in which the arc advances along the welding line.
Figure 17:
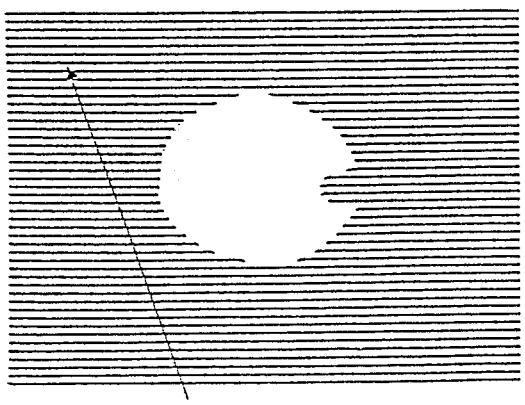
FIG. 17 is a schematic diagram illustrating the state in which the arc goes out of the welding line.

In the present invention, the image pickup device such as the TV camera is disposed over the joint, as shown in FIG. 15. The arc 3 is splashed generally in a conical shape from the tip of the wire 6. Because of the step on the welding line 7, however, the arc 3 is stepped on the welding line, which is unoccupied by the bead, in front of the torch. The stepped portion of the arc can be detected, when picked up by the device 1 over the joint, as the characteristic portion. FIGS. 16 and 17 illustrate the respective states in which the arc advances along and goes out of the welding line 7.

Figure 18:
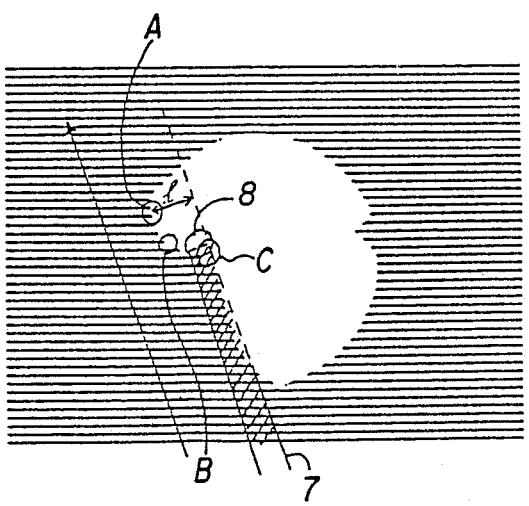
FIG. 18 is a schematic diagram illustrating the state in which the arc is at the welding end point.

For example, when the welding end point 8 is reached, as shown in FIG. 18, the arc is not shielded any more in front near the welding end point so that it spreads around the wall of the work. The welding end point can be detected by detecting the characteristic portion in which the arc spreads only in front.

Figure 19:
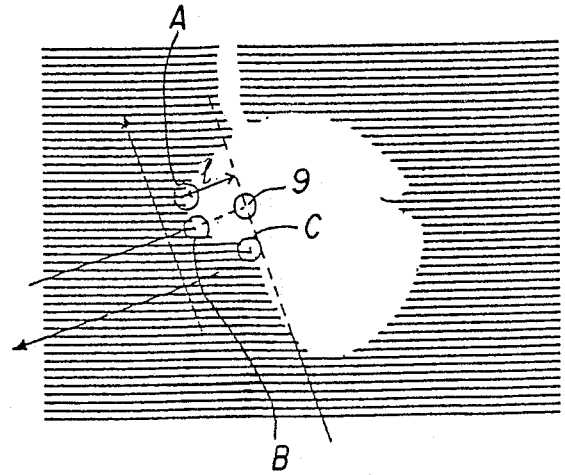
FIG. 19 is a schematic diagram illustrating the state in which the arc is at the external corner point.

On the other hand, when the external corner point of the joint is reached, as shown in FIG. 19, the wall having shielded the arc turns at a right angle in front of the arc so that the arc takes a shape in which a circle is partially cut off at a right angle. As a result, the external corner point can be detected.

Incidentally, the arc shapes of FIGS. 18 and 19 are hardly discriminated. However, whether the terminal point of that welding line is the welding end point or the external corner point in the course of the welding operation can be clearly discriminated because of the present program of the welding control.

Figure 20:
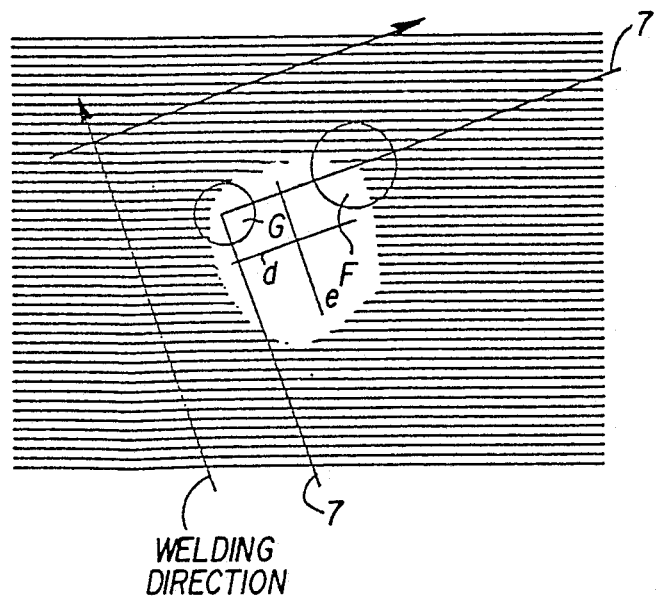
FIG. 20 is a schematic diagram illustrating the state in which the arc is at the internal corner point.

As shown in FIG. 20, moreover, when the internal corner point of the joint is reached, the arc having spread in front is shielded by the front wall of the work so that its front and sides are blunted. Thus, the internal corner point can be detected.

Next, the embodiment of the present invention will be described in the following. FIG. 15 shows an example of the lap joint welding, in which: reference numeral 1 designates a torch; numeral 2 a wire; numeral 3 an image pickup device; numerals 4 and 5 members to be welded; and numeral 6 an arc. Incidentally, let it be assumed that the torch 1 is moving in the forward direction (toward the back of the drawing) while splashing the arc.

At this time, the image picked up by the pickup device 3 is binary-coded, as illustrated in "white" in the arc portion and "black (or hatched)" in the remainder in FIG. 16.

The image pickup device 3 is constructed of the CCD camera, and the image picked up by the device 3 is processed by the detection controller and displayed by the CRT display device in response to the start instruction of the robot controller.

Prior to the welding operation, the detection controller 23 first detects the welding line (at step 101 of FIG. 15). This detection is made from the image picked by the image pickup device 3. This image is shown in FIG. 15(a), in which are projected a welding line 31, a wire 32, a wire shadow 33 and a torch 34. The welding line 31 is one on which the two members to be welded contact.

Next, the position of the welding line on a screen (i.e., on the coordinates set on the frame) is stored (at step 102 of FIG. 15).

Then, a window (i.e., a region of the image to be processed) is set with respect to the welding line (at step 103 of FIG. 15).

This window is set to include the portion having the unique shape with the welding line on a Y axis, as shown in FIG. 15(b).

The steps described above are to be accomplished in advance.

When the robot controller 22 issues the welding start instruction, the detection controller 23 fetches the image data (at step 104 of FIG. 15).

Then, the image picked up is latched in a video RAM and is binary-coded white in the arc portion and black in the remainder (at step 105 of FIG. 15).

Then, the window is scanned horizontally from above the lefthand side, to detect changes in the binary level (at 106 of FIG. 15).

The method of discriminating the welding end point and the external corner point is exemplified, as shown in FIGS. 18 and 19, by the method of detecting the inflection point A of the binary arc pattern, by the method of detecting the inflection point B, by the method of detecting the inflection point C, or by the method of detecting the length l of the extending arc.

On the other hand, the method of discriminating the internal corner point is exemplified by the method of detecting the disappearance of a characteristic portion E, as shown in FIG. 16, by the method of detecting a characteristic portion F or G, as shown in FIG. 20, or by the method of detecting the longitudinal and widthwise lengths e and d of the arc and their ratio.

Thus, in the present invention, the singular point on the welding line is detected by using the arc itself as the object for detecting the singular point and by analyzing the shape of the arc. This makes it unnecessary to use an expensive external light source such as a laser thereby remarkably simplifying the construction. Moreover, the arc itself is an intensive light source so that it is hardly influenced by any other light to require any special cutoff filter or band-pass filter, but it is sufficient to use a welding filter for reducing the quantity of light. Nor is required any shutter for synchronization when the base current for the pulse welding operation to be used in the system deeming the arc as the disturbance light is supplied or when the arc is short-circuited. As a result, no restriction is made by the types of the welder or the wire, the welding conditions and so on. Since no special wavelength of the arc is observed, no restriction is made by the specification of the TV camera, but an existing CCD (having a sensitivity falling within a visible range from 300 to 1,000 nm) can be used. Because of the pattern analysis of the arc, moreover, the detection can be accomplished even for the lap joint welding operation of a thin plate of 1 mm or less.

Next, the fourth invention for accomplishing the fourth object of the present invention will be described in the following. It has been confirmed that, if the image of the welding situation is picked up by the TV camera disposed over the joint portions to be welded in an automatic welder for weaving operations, the TV screen allows only the contour of the arc to be discriminated but the arc contour itself intensely reflects the welding groove state. It has been found that a characteristic shape is exhibited in a portion of the contour of the shape of the arc image if a gap is formed in the welding groove. By making use of this phenomenon, the present invention contemplates to detect the welding groove gap.

It has also been experimentally confirmed that the detection of the welding groove gap can be performed even by the weaving welding operation to weld the welding groove gap properly.

The present invention will be specifically described in the following in connection with the embodiment of the lap joint welding operation with reference to the accompanying drawings. The present invention is characterized by the two major characteristics: the gap detection by the pattern analysis of the arc; and the gap according welding through the weaving under the control of the weaving amplitude by the arc pattern analysis.

Figure 21:
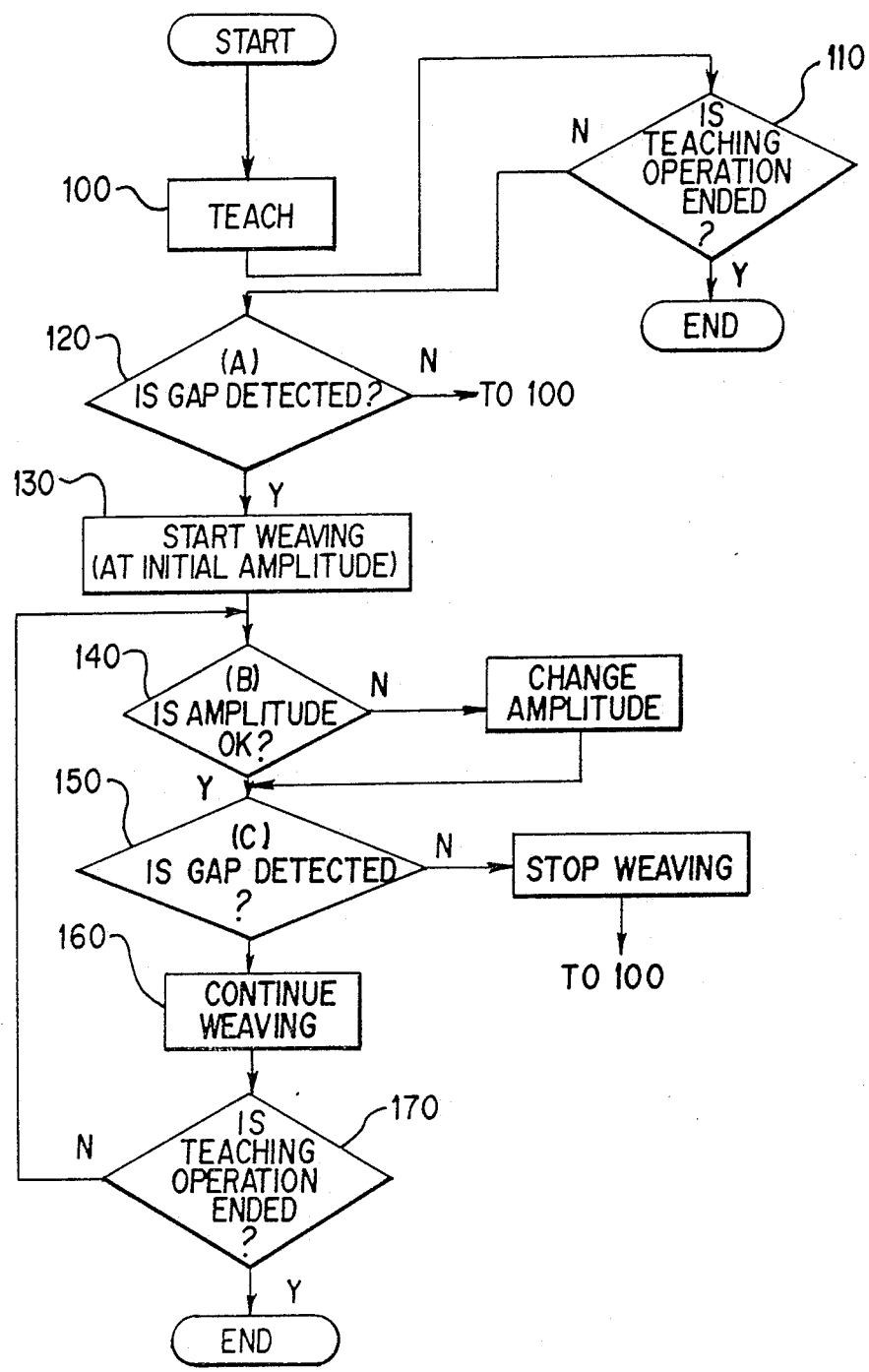
FIG. 21 is a flow chart diagram showing the overall operation for carrying out a fourth embodiment of the present invention.

FIG. 21 is an overall flow chart for explaining the present invention. First of all, a teaching operation is started to detect the gap. If the gap is detected at step 120, the weaving operation is started. The initial amplitude value at this time is different depending upon the dispersion of the gaps of the works but is set two or three times as thick as the plate in the case of the lap joint. The weaving amplitude is changed if improper. In the proper case, the gap detection is accomplished during the weaving welding operation (at step 150). While the gap is being detected, the weaving process is continued and repeated until the teaching operation is ended.

Next, the principle of the gap detecting method according to the present invention will be described in the following.

Figure 22:
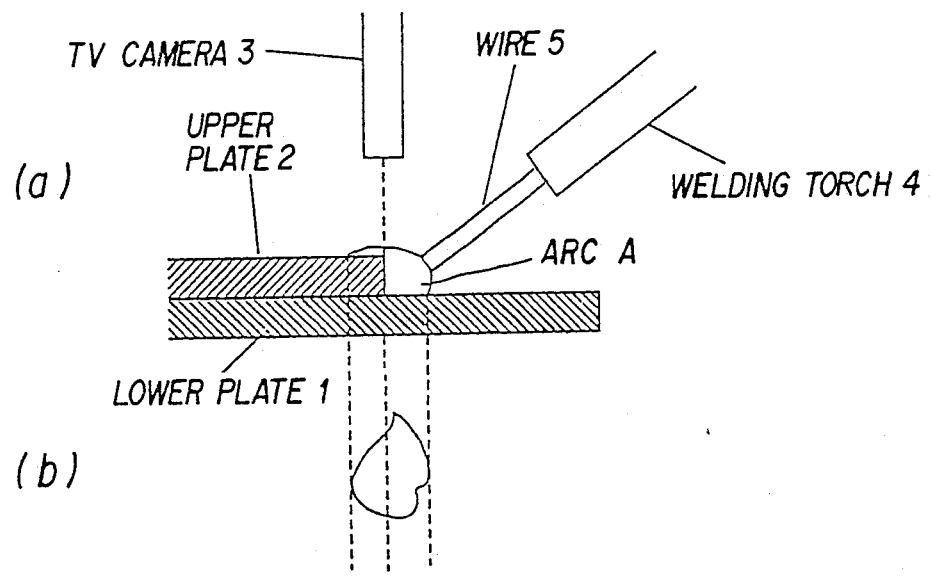
FIG. 22(a) is a schematic diagram of the fourth embodiment in which there is no gap between the lower plate and the upper plate.
FIG. 22(b) is a schematic view of the arc produced with the apparatus of FIG. 22(a)

In case there is no gap between a lower plate 1 and an upper plate 2, as shown in FIG. 22(a), the arc spreads about one half width over the upper plate 2, as shown in FIG. 22(b). If, on the other hand, a gap g is present between the lower plate 1 and the upper plate 2, as shown in FIG. 23(a), the arc cannot spread as much over the upper plate 2, as shown in FIG. 23(b). If the arc is observed by a TV camera over the work, the gap of the work can be detected in terms of the size of the arc at the side of the upper plate. In the Figures: numeral 4 designates a welding torch; numeral 5 a wire; and letter A the arc.

Figure 24:
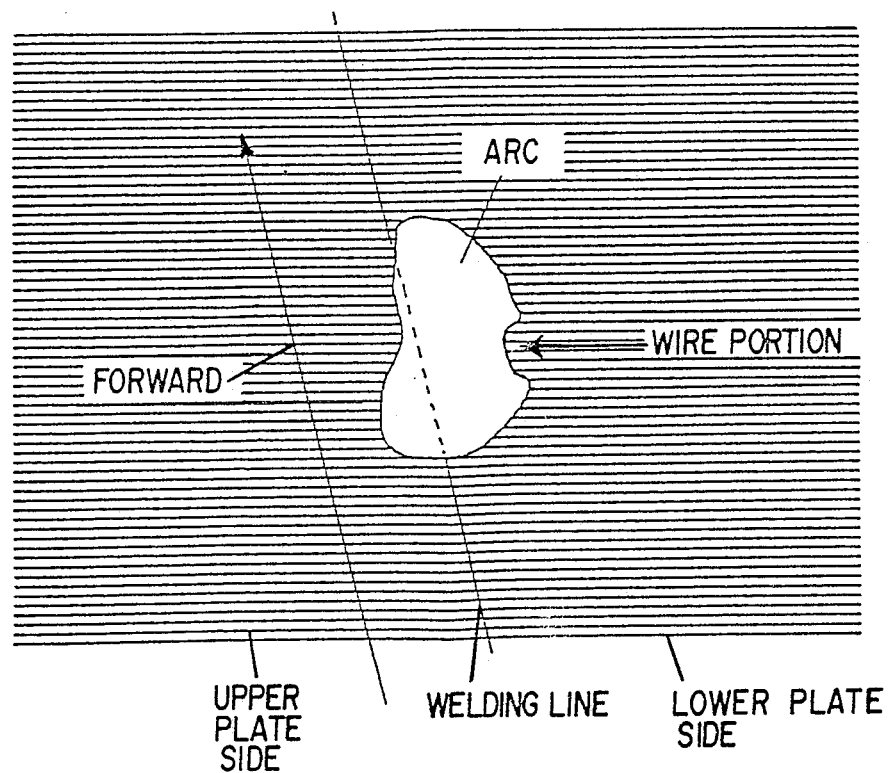
FIG. 24 is a schematic view showing the arc produced in the presence of a gap.

According to the results of the experiments and observations, moreover, it has been confirmed that the arc at the upper plate side has not only a reduced size but also a dented shape, as shown in FIG. 24. This makes it possible to detect the gap in terms of the arc shape. One example of the flow chart of this detection is illustrated in FIG. 25. First of all, the initial conditions set a window in which an arc having the welding line on a y coordinate. Then, the robot teaching operation is started, the rightward and leftward displacements are corrected. After these corrections, the gap detecting routine is entered. A specific example of this routine will be described in the following.

(1) Method A:

The scan is accomplished from the lefthand upper corner in parallel with the Y-axis to detect the level changes of 0→1→0→1. This method makes use of the fact that the presence of the gap will dent the arc at the upper plate side.

Figure 23:
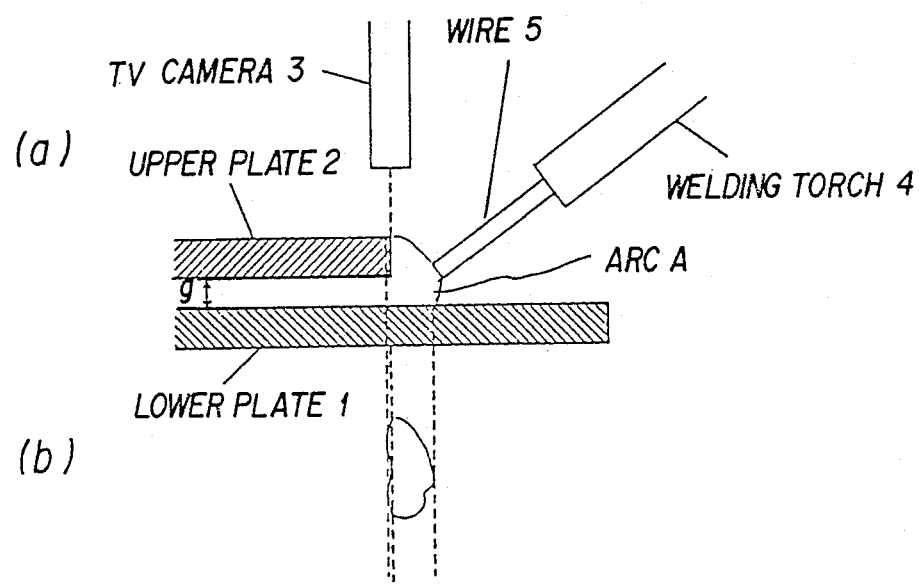
FIG. 23(a) is a schematic diagram of the fourth and the upper plate.
FIG. 23(b) is a schematic view of the arc produced with the apparatus of FIG. 23(a)

(2) Method B:

The scan is accomplished from the lefthand upper corner in parallel with the X-axis to detect the inflection point C thereby to measure the distances $l_1$ and $l_2$ to the welding line. These distances $l_1$ and $l_2$ are compared so that the gap is detected if $a \times l_1 < l_2$ (wherein a: a constant determined experimentally). This method makes use of the fact that the arc at the upper plate side has its size reduced if the gap is present, as shown in FIG. 23.

Figure 26:
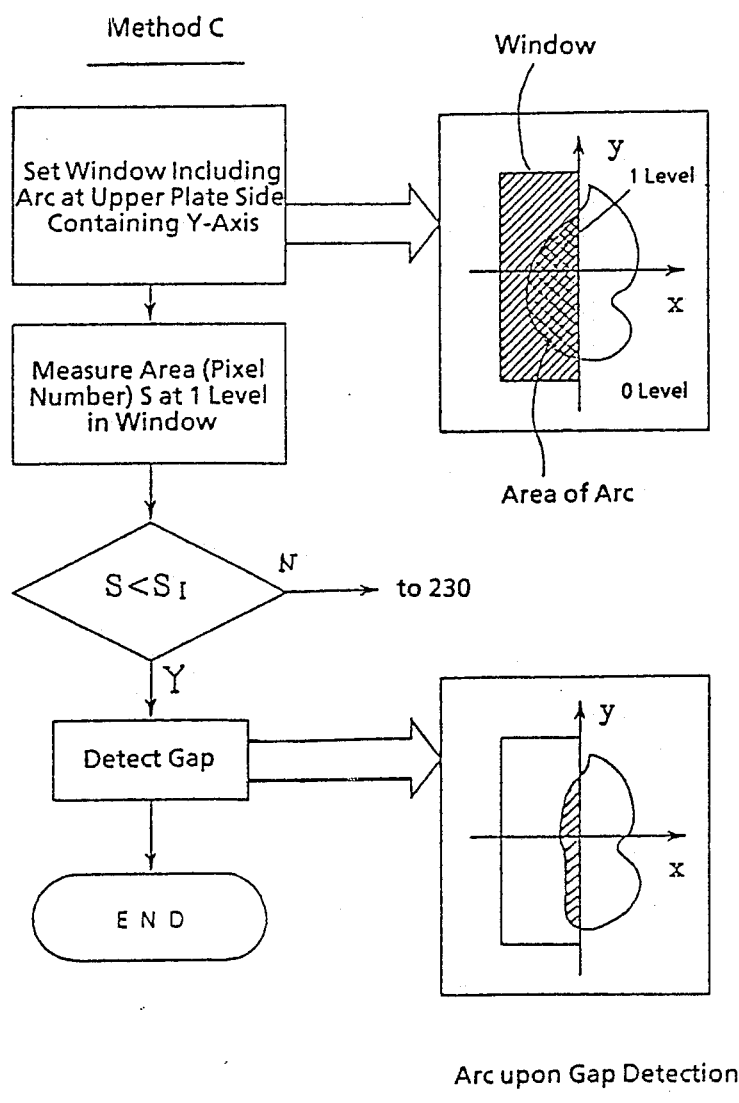
FIG. 26 is a flow chart diagram illustrating an embodiment of the present invention in which the side of the arc at the upper plate side is reduced in the presence of a gap.

(3) Method C (See FIG. 26):

This method makes use of the fact that the size of the arc at the upper plate side is reduced in the presence of the gap, like the method B. This size reduction is detected by determining the area S of the arc at the upper plate side. If the arc area S becomes smaller than a constant $S_f$ which is experimentally determined, it is judged that the gap is present. In the remaining cases, the routine is returned to step 230 of FIG. 25.

Next, the method of changing the weaving amplitude for the gap will be described in the following.

If the size of the gap is unchangeable, the weaving amplitude may be constant. If the gap size is changeable, on the other hand, it is necessary to make controls to make the weaving amplitude larger if the gap is large and the same smaller if the gap is small.

Whether or not the weaving amplitude is proper for the gap is judged in terms of the arc pattern, according to the present invention, the amplitude is changed if not (namely, if the amplitude is excessively large or small). A flow chart for detecting whether or not the weaving amplitude is proper for the gap is illustrated in FIG. 27.

Figure 27:
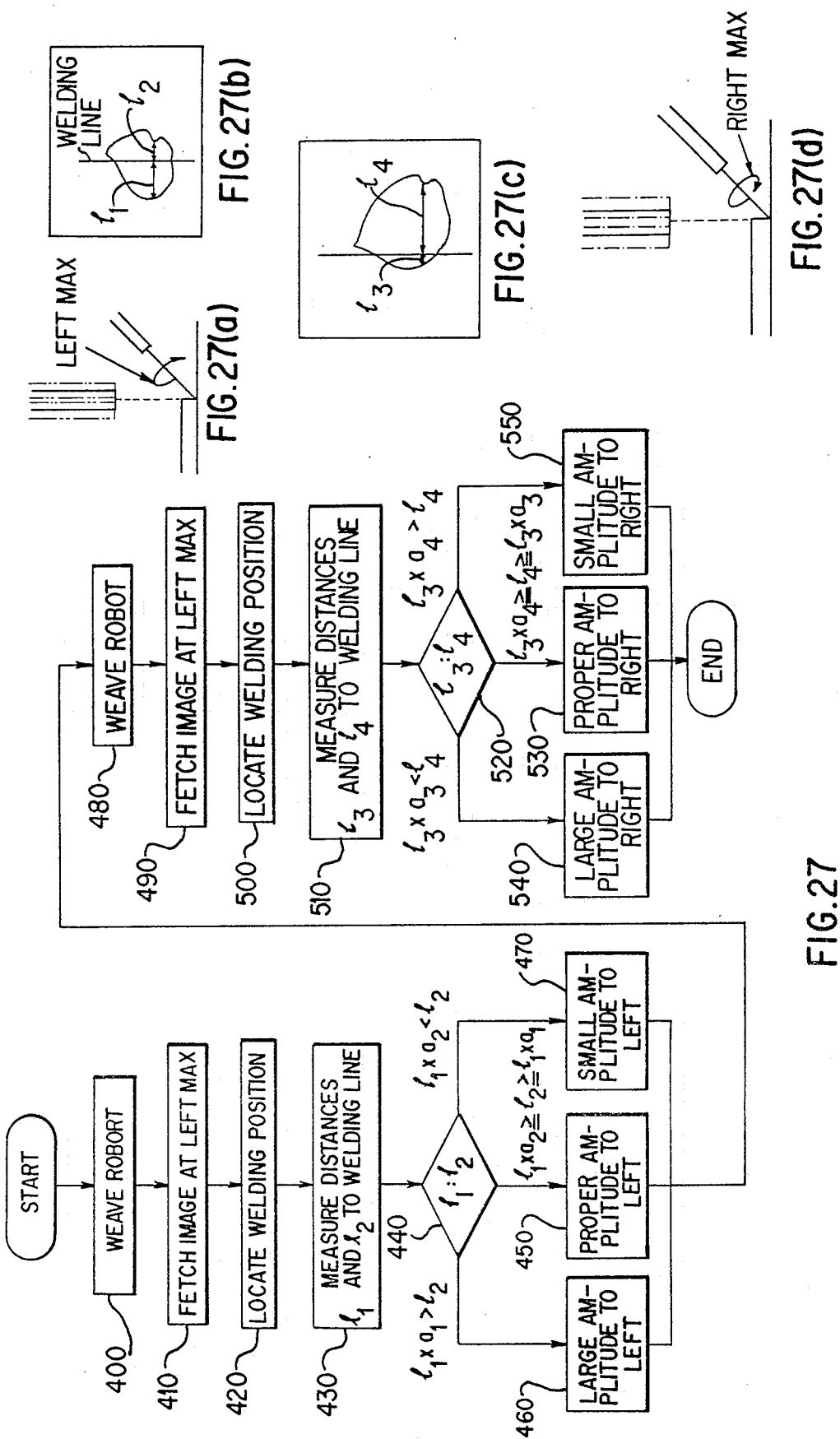
FIG. 27 is a flow chart diagram used for detecting whether the weaving amplitude is proper for the gap.

As seen from the flow chart of FIG. 27, a synchronization is first taken at the instant of "Left Max" to fetch the image during the robot weaving operation. Then, the distances $l_1$ and $l_2$ to the welding line are measured and compared. It is judged that the amplitude in the leftward direction is large, if $l_1 \times a_1 > a_2$, and that the amplitude in the leftward direction is small, if $l_1 \times a_2 < l_2$. Here, letters $a_1$ and $a_2$ designate constants which are experimentally determined. It is detected whether or not the arc at the upper plate side is properly sized to fill the gap, at the instant of the "Left Max", namely, when the weaving operation is shifted closest to the upper plate side. The gap cannot be filled, if the arc at the upper plate side is small, and the bead appearance is bad if that arc is large.

Next, another synchronization is taken at the instant of "Right Max" to pick up the image. Then, the distances $l_3$ and $l_4$ to the welding line are measured and compared. It is judged that the amplitude in the rightward direction is large, if $l_3 \times a_3 < l_4$, and that the amplitude in the rightward direction is small, if $l_3 \times a_4 > l_4$. Here, letters $a_3$ and $a_4$ designate constants which are experimentally determined. It is detected whether or not the arc at the lower plate side is properly sized to fill the gap, at the instant of the "Right Max", namely, when the weaving operation is shifted closest to the lower plate side. The gap cannot be filled, if the arc at the lower plate side is small, and the bead appearance is bad if that arc is large.

For the gap detection during the weaving, it is sufficient to take the synchronization and fetch the image when the welding torch comes to the weaving center. Then, the gap can be detected by a method similar to that for the linear welding operation.

Moreover, a function similar to the gap detection can be afforded by a method of returning the welding operation to the linear one while judging that the gap is zero if the weaving amplitude is controlled to a certain constant or smaller.

The example described above is the method of detecting the propriety of the amplitude for one period of the weaving operation to make a control for a succeeding period.

As has been described hereinbefore, according to the present invention, the groove gap is detected so that it may be filled during the welding operation, by observing the arc directly and by analyzing the portion in which the arc takes a unique shape.

As a result, the adaptability control can be accomplished even for the real-time fluctuations due to the thermal strain while the gap is being welded. This drastically enlarges allowances for the precisions of works and jigs thereby to widen the range of application of the robot welding technique.

Next, the fifth invention will be described in the following. This invention is based upon the simple principle that the wire never fails to have its tip position varied in coordinates if it comes into contact with the work because it is made flexible.

Specifically, in the present invention, the welding torch and the image pickup device such a the CCD camera are fixedly carried on the wrist of the robot. This causes no motion of the image of the wire tip in the field of view of the pickup device even if the robot wrist is either moved vertically or horizontally or rotated.

If the wire has its tip contacting with the wire when the robot wrist is moved toward the work, it is retracted or deformed because of its flexibility. This mechanical change in position appears in a positional change of the image of the wire tip in the field of view of the image pickup device. This positional change is grasped by the image processing to judge that the wire has contacted with the work. Thus, if the position of the work is detected by storing the coordinates of the robot at the instant of the positional change, it is possible to detect the welding start point from that work position.

Figure 28:
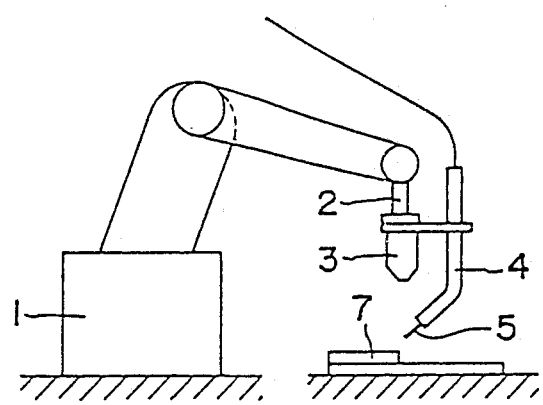
FIG. 28 is a schematic view showing a robot system with which a fifth embodiment of the present invention is used.

FIG. 28 is a schematic view showing the system for accomplishing the method of the present invention. In FIG. 28: reference numeral 1 designates the robot; numeral 2 the wrist of the robot 1; numeral 3 the CCD camera exemplifying the image pickup device; numeral 4 the welding torch; numeral 5 the wire to be let off from the leading end of the welding torch 4; and numeral 7 the work. As shown in FIG. 28, the constructions made so that the CCD camera 3 and the welding torch 4 are carried on the leading end of the wrist 2 of the robot 1 so that their relative positions may always be fixed. Moreover, the welding torch 4 is positioned obliquely, e.g., at 45 degrees with respect to the optical axis of the CCD camera 3. This oblique positioning itself has no relation to the gist of the present invention.

Figure 29:
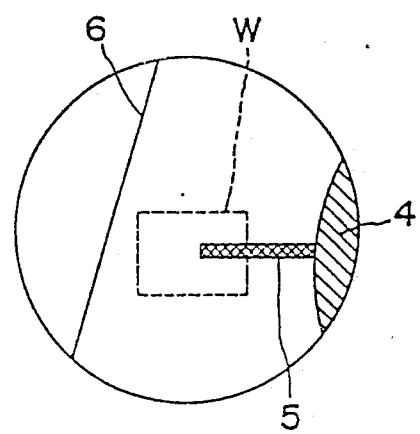
FIG. 29 is a schematic view of an image captured by the CCD camera with the embodiment of FIG. 28.

FIG. 29 illustrates the field of view of the images of the wire tip and the welding line 6, which are being monitored by the CCD camera 3. As seen from this illustration, the image of the wire 5 is fixed in the field of view of the CCD camera 3 no matter how the robot 1 might move.

Figure 30:
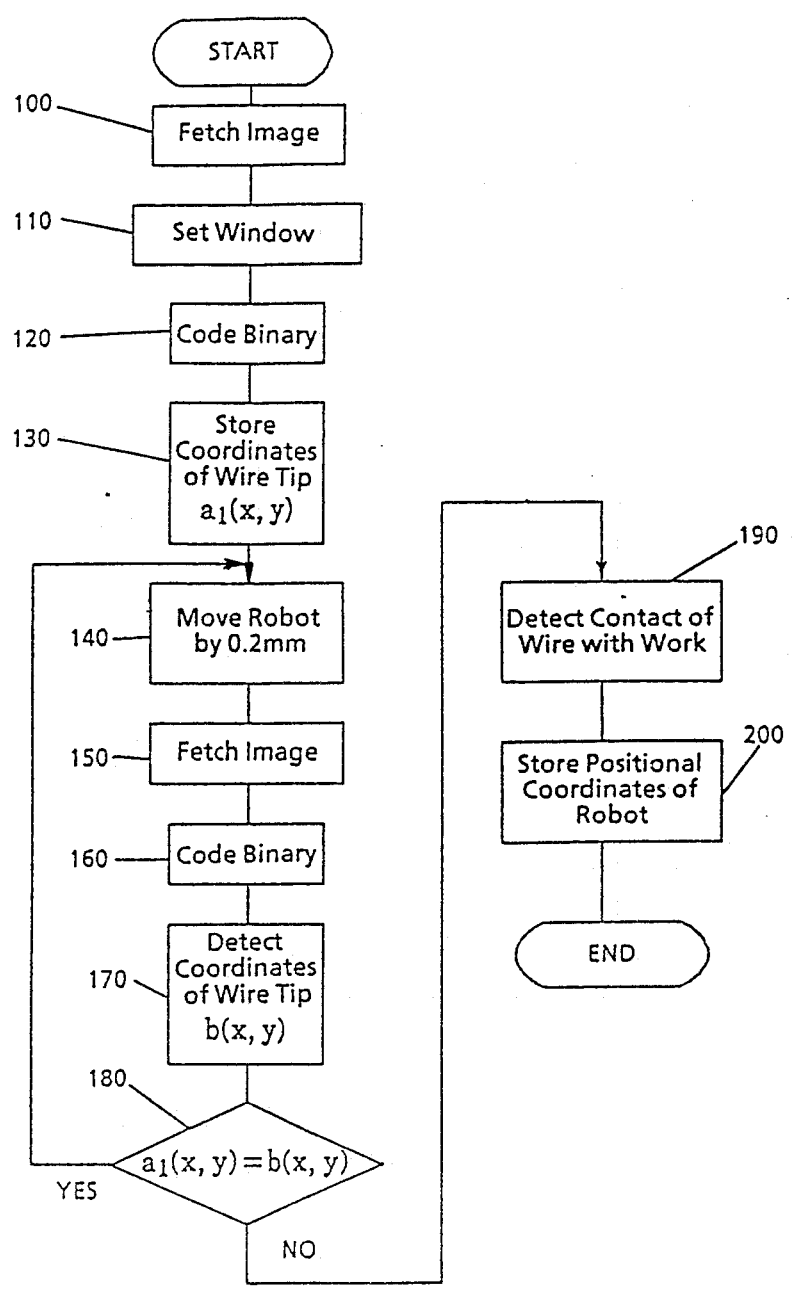
FIG. 30 is a flow chart diagram for illustrating operation of the image processing of the present invention of FIG. 28.
Figure 31:
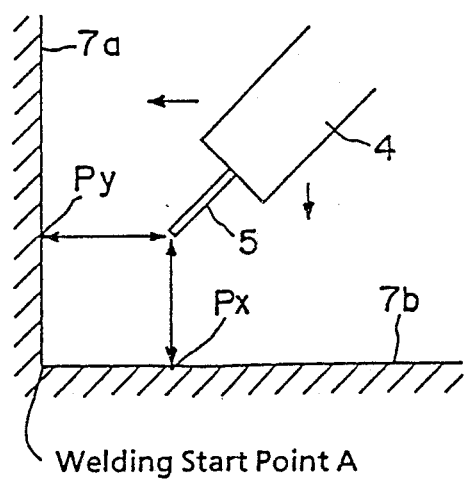
FIG. 31 is a schematic diagram showing the relation between the contact point of the wire with the work and the welding start point.

Next, the image processing flow according to the present invention will be described with reference to FIG. 30. First of all, the image is taken at step 100 by the CCD camera 3. Then, at steps 110 and 120, a window W (as shown in FIG. 29) is set in a region including the wire tip to code binary the image taken by the CCD camera 3. At step 130, the coordinates $a_1(x, y)$ of the wire tip in the binary image are stored.

Next, at step 140, the robot is moved towards the work by a predetermined distance such as 0.2 mm. The coordinates of the wire tip after the movement are detected, as at $b(x, y)$, through the routine including steps 140 to 170. These new coordinates $b(x, y)$ are compared with the initial ones $a_1(x, y)$ at step 180. If this comparison reveals no difference, the wire has no contact with the work so that the robot is further moved by 0.2 mm. These steps are repeated until the coordinates change if any, the routine proceeds to step 190 to judge that the wire has contacted with the work. At step 200, the coordinates at this time are stored as the positional coordinates of the robot. The welding start point is detected on the basis of the coordinates stored.

According to the experimental results, the changes in the coordinates of the wire tip are 5 pixels or about 0.4 mm at the instant of contact with the work for the CCD element having ($256 \times 256$) pixels even when the robot moves at a low speed of 10 cm/min so that they can be detected without any difficulty.

As has been described above, according to the present invention, the work contact of the wire is detected by grasping the positional changes of the image of the wire tip when the robot wrist is moved towards the work.

As a result, it is possible to detect the contacting state physically even if the work or wire is covered with the oxide skin. Even with the simple construction, therefore, the detection of contact can be accomplished with remarkably high reliability.

Especially if the present invention is utilized with the robot vision system using the CCD camera, the changes in the vertical direction can be obtained from the two-dimensional information so that three-dimensional information can be attained highly accurately even by the CCD camera which might otherwise afford the horizontal information.

Figure 32:
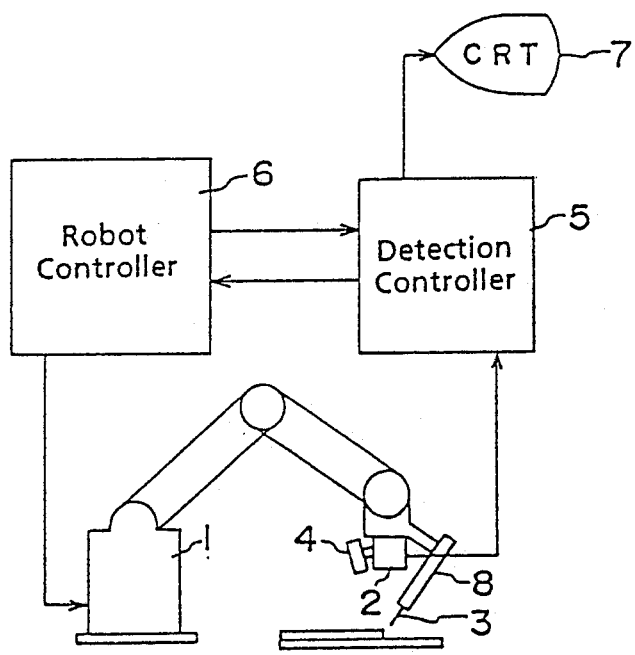
FIG. 32 is a schematic-block diagram showing a sixth embodiment of the present invention.

Finally, the sixth invention for achieving the sixth object of the present invention will be described in the following. In the present invention, as shown in FIG. 32, the industrial TV camera 2, the light source 4 and the torch 8 are carried on the leading end of the wrist of the robot 1, and the wire extension is then set to the optimum length. The image signals coming from the industrial TV camera 2 are processed in the detection controller 5, and the positions of the shadows of the welding line and the welding wire 3 are detected from the image data until the image position of the tip of the wire 3 and the relations between the wire 3 and the shadow 12 of the wire are stored. In the actual detecting operations, the changes in the burning length of the wire 3 can be responded to by the computations making use of the stored tip position of the wire 3 in the robot controller 6. The image data are displayed in the CRT 7 so that they can be monitored.

There is a discrepancy between the distance on the image and the actual distance if an equation dictating the relation of the discrepancy is prepared, the detecting accuracy can be improved.

Figure 33:
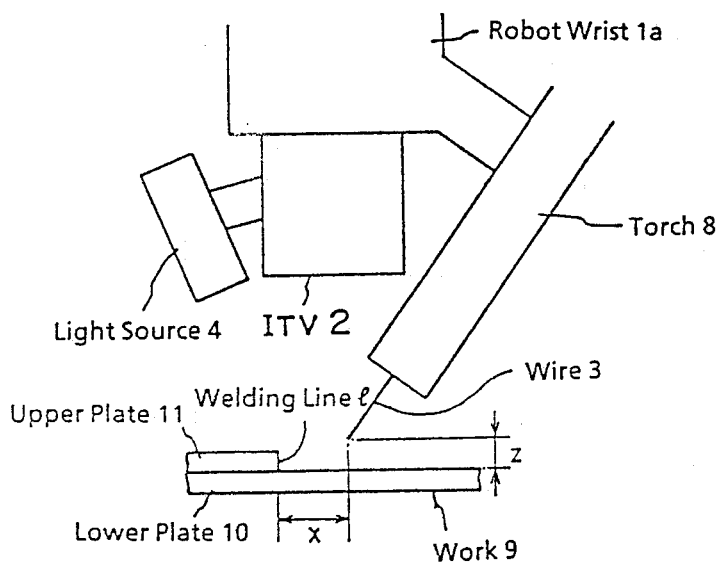
FIG. 33 is an enlarged schematic diagram showing an essential portion around the robot wrist.
Figure 34:
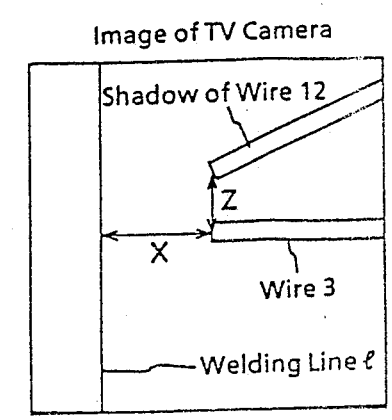
FIG. 34 is a schematic diagram of a video image produced with the embodiment of FIG. 32.

FIG. 33 is an enlarged vice showing the vicinity of the welding line. As shown, the industrial TV camera 2 and the light source 4 are carried on the leading end of the wrist 1a of the robot 1. In FIG. 33: reference numeral 8 designates the torch; numeral 9 the work; numerals 10 and 11 the lower and upper plates of the work 9; and letter l the welding line. The image of the vicinity of the welding start point taken by the aforementioned TV camera 2 is illustrated in FIG. 34. The distance x from the tip of the wire 3 to the welding line l corresponds to X in the image, and the distance z from the tip of the wire 3 to the lower plate 10 corresponds to the distance Z between the wire 3 and its shadow 12 in the image. Therefore, the real distances x and z can be determined from the distances X and Z on the image by determining the correlations between the real distances x and z and the distances X and Z on the image.

Figure 35:
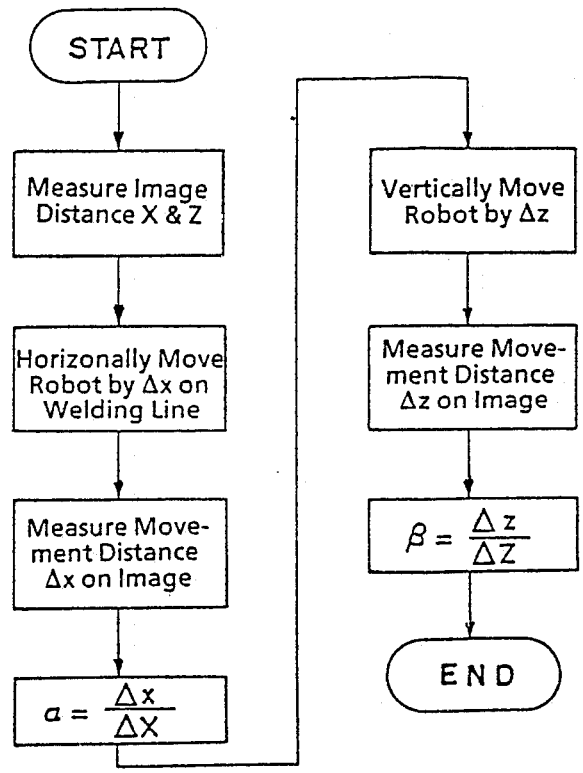
FIG. 35 is a flow chart diagram of the sixth embodiment of the present invention.
Figure 36:
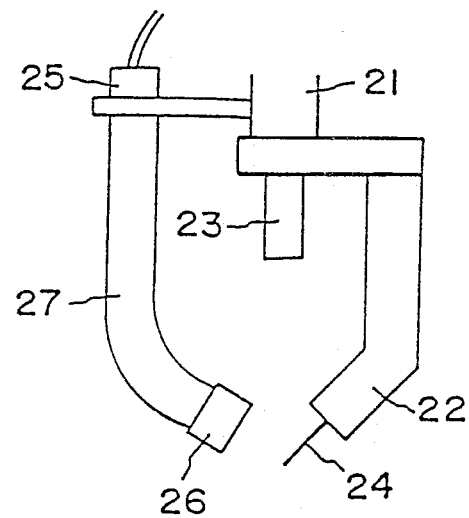
FIG. 36 is a schematic diagram showing a system which has been proposed by the Applicant.

The flow chart for the method of determining the correlations $\alpha$ and $\beta$ is illustrated in FIG. 35. After the distances X and Z on the image have been measured, the robot is moved horizontally by $\Delta x$ from the welding line l, and the resultant moving distance $\Delta X$ on the image is measured. From these measurements, the correlation $\alpha = \Delta x/\Delta X$ is determined. Next, the robot is moved vertically by $\Delta z$, and the moving distance $\Delta Z$ on the image is likewise measured to determine the correlation $\beta = \Delta z/\Delta Z$.

Thus, by determining the correlations $\alpha$ and $\beta$, the detection controller 5 can determine the actual distances $x = \alpha \times X$ and $z = \beta \times Z$ from the image distances X and Z and transmit them to the robot controller 6.

The robot controller 6 corrects the real distances transmitted to move the robot 1. As this amount of correction, there is inputted the difference between the position determined by the aforementioned computations and the start position which is intended by the worker after his actual execution of the start point detection.

Figure 37A:
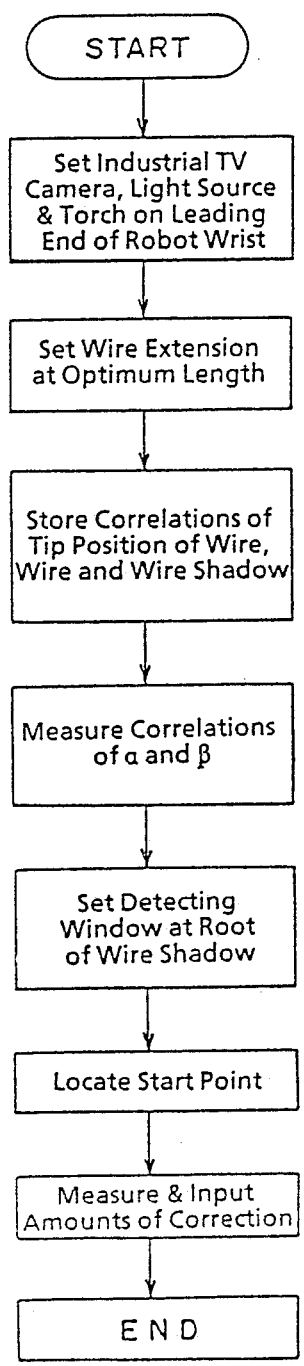
FIG. 37(a) is a flow chart diagram of specific operations of the present inventions in which the industrial video camera, the light source and the torch are set on the leading end of the robot wrist.
Figure 37B:
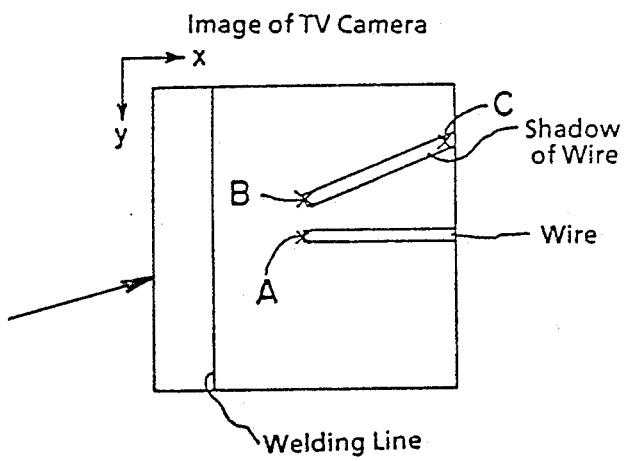
FIG. 37(b) is a schematic diagram showing correlations between the wire and its shadow.
Figure 37C:
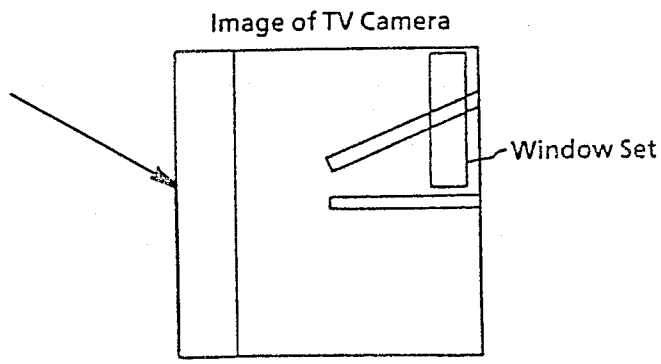
FIG. 37(c) is a schematic diagram showing the detecting window set at the root of the wire shadow.

The flow chart of the specific operations is illustrated in FIG. 37(a). In FIG. 37(a), the industrial TV camera, the light source and the torch are set on the leading end of the robot wrist. After the wire extension has been set to the optimum length, the positional coordinates of the wire tip (i.e., the x- and y-coordinates of the point A) and the correlations between the wire and its shadow (i.e., the gradients of the points B and C and the x-coordinate of the point B) are stored (as shown in FIG. 37(b)). The correlations $\alpha$ and $\beta$ are measured in accordance with the flow chart of FIG. 35. The detecting window is set at the root of the wire shadow (as shown in FIG. 37(c)) to perform the start point detecting operation, and the amount of correction is measured and inputted.

Figure 38A:
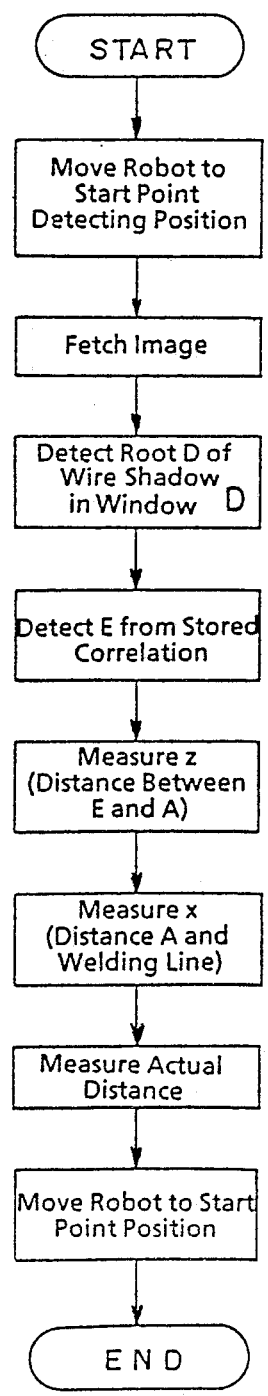
FIG. 38(a) is a flow chart diagram of a start point detection operation.
Figure 38B:
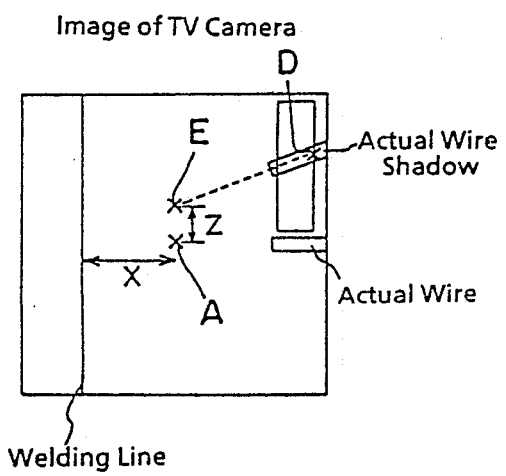
FIG. 38(b) is a schematic view of the image of the video camera obtained with the flow chart of FIG. 38(a).

Next, the flow chart of the start point detection operations is illustrated in FIG. 38(a). First of all, the leading end of the robot tip is moved to the start point detecting position to pick up the image. The position D of the wire shadow in the window is located, and an ideal point E is detected by computing the stored correlations. The distance Z between the stored wire tips A and E is measured. The actual distance is computed from the measured values Z and X and the predetermined correlations $\alpha$ and $\beta$. The distance of movement of the robot is computed from the amount of correction to move the robot to the position of the start point. The image of the TV camera at this time is illustrated in FIG. 38(b).

As has been described hereinbefore, according to the present invention, the welding start point is detected by carrying the image pickup device such as the industrial TV camera on the leading end portion of the wrist of the robot and by detecting the position of the shadow of the wire through the image processing. Thus, the information from the TV camera in the vertical direction can be obtained by making use of the shadow of the wire. Moreover, the reliability can be enhanced by making use of the TV camera because there is no mechanical drive unit in the robot accessories. The system of the present invention can be easily adjusted because no offset is present between the wire tip and the sensor, as is different from the case using the laser beam. Nor is required for the searching operation of the wire earth method of the prior art, so that the detection can be accomplished at a high speed.

Since, moreover, the positional relations among the camera, the light source and the welding torch are always fixed, the position of the wire, the gradient of the shadow of the wire, the ratio $\alpha$ of the shadow and distance of the wire, and the ratio $\beta$ of the welding line and the wire distance can be determined with the wire length being initially set at the optimum value. In the actual case of the start point detection, the window can be set at the root of the shadow of the window to detect the imaginary point from the gradient $\theta$ so that the length of the wire need not be held constant. This makes the wire inching unnecessary.

INDUSTRIAL APPLICABILITY

The present invention provides a sensor technique for detecting a variety of welding positional information necessary for controlling the welding robot. The present invention can be applied to automotive industries, designers and manufacturers of control devices, which require precision automatic welding.

We claim:

1. In an arc welding along a welding groove position while locating the welding groove position, a welding groove position locating method for locating a welding groove position, comprising the steps of:
   locating an image pickup device above a joint portion of a member to be welded;
   presetting a vertical axis of a window of said image pickup device to correspond with a weld line;
   detecting an image of the shape of an arc by means of said image pickup device;
   binary-coding the detected image of the shape of the arc;
   scanning said binary-coded image of the shape of the arc within said window from a top corner of said window along the horizontal direction of said window; and
   detecting the welding groove position on the basis of a point where a first change occurs in said binary level while scanning.

2. A welding groove position locating method according to claim 1, further including the step of making said image pickup device integral with a welding torch so that said image pickup device can detect the image following movement of said welding torch.

* * * * *